United States Patent [19]

Akagiri et al.

[11] Patent Number: 5,608,713

[45] Date of Patent: Mar. 4, 1997

[54] BIT ALLOCATION OF DIGITAL AUDIO SIGNAL BLOCKS BY NON-LINEAR PROCESSING

[75] Inventors: Kenzo Akagiri; Yoshiaki Oikawa, both of Kanagawa; Hiroshi Suzuki, Saitama, all of Japan

[73] Assignee: Sony Corporation, Tokyo, Japan

[21] Appl. No.: 385,287

[22] Filed: Feb. 8, 1995

[30] Foreign Application Priority Data

Feb. 9, 1994 [JP] Japan .................................. 6-015117

[51] Int. Cl.$^6$ ...................................................... H03M 7/30
[52] U.S. Cl. ......................... 369/124; 369/107; 395/2.38; 395/2.39; 395/2.13; 381/30; 381/29; 381/37
[58] Field of Search ......................... 369/124, 54, 275.1, 369/107; 341/51; 381/37, 29, 30, 45, 31; 370/109, 118; 375/1, 122, 240; 395/2.38, 2.12, 2.35, 2.33, 2.39, 2.13; 380/4, 3, 28, 46, 49

[56] References Cited

U.S. PATENT DOCUMENTS

| | | |
|---|---|---|
| 3,349,183 | 10/1967 | Campanella . |
| 4,184,049 | 1/1980 | Crochiere et al. .................... 179/1 SA |
| 4,516,241 | 5/1985 | Farah et al. ......................... 370/110.1 |
| 4,535,472 | 8/1985 | Tomcik ..................................... 381/31 |
| 4,569,058 | 2/1986 | Grallert ..................................... 375/27 |

(List continued on next page.)

FOREIGN PATENT DOCUMENTS

| | | | |
|---|---|---|---|
| 0349325A2 | 1/1990 | European Pat. Off. | ........ G11B 20/10 |
| 0428156A2 | 5/1991 | European Pat. Off. | .......... H03M 7/30 |
| 0446031A3 | 9/1991 | European Pat. Off. | .......... H04B 1/66 |
| 0458645A2 | 11/1991 | European Pat. Off. | .......... H04B 1/66 |
| 0463473A2 | 1/1992 | European Pat. Off. | ...... G06F 15/332 |
| 0466190A2 | 1/1992 | European Pat. Off. | ........ G11B 20/10 |
| 0473367A1 | 3/1992 | European Pat. Off. | .......... H03M 7/30 |
| 0506394A2 | 9/1992 | European Pat. Off. | .......... G10L 7/00 |
| 0525809A2 | 2/1993 | European Pat. Off. | .......... H04B 1/66 |
| 0370277A3 | 5/1990 | Germany | .......................... H04B 1/66 |
| 0423050A1 | 4/1991 | France | ............................... H04B 1/66 |
| 01069181 | 3/1989 | Japan | ........................... H04N 7/137 |
| 629934 | 2/1994 | Japan | ............................ H04B 14/06 |
| 6-149292 | 5/1994 | Japan | ............................. H03M 7/30 |
| WO90/09064 | 8/1990 | WIPO | .............................. H04B 1/66 |
| WO91/16769 | 10/1991 | WIPO | .............................. H04B 1/66 |
| WO92/17884 | 10/1992 | WIPO | ........................... G11B 20/10 |

OTHER PUBLICATIONS

An application-specific FFT processor Electronic Engineering, Jun. 1988 pp. 100 and 104–106.

Application of Quadrature Mirror Filters To Split Band Voice Coding Schemes, Esteban et al., May, 1977 IEEE International Conference on Acoustics, Speech & Signal Processing, pp. 191–195.

Polyphase Quadrature Filters—A New Subband Coding Technique, Rothweiler ICASSP 1983, Boston, vol. 3 of 3, pp. 1280–1283, Apr. 1983.

The Critical Band Coder–Digital Encoding of Speech Signals Based on the Perceptual Requirements of the Auditory System, Krasner, Apr. 1980 IEEE, vol. 1–3, pp. 327–331.

An Application Specific DSP Chip for 100 MHZ Data Rates, Magar et al., IEEE international conference on acoustic speech & signal processing. 1988—pp. 1989–1992, Apr. 11–14, 1988.

(List continued on next page.)

Primary Examiner—Georgia Y. Epps
Assistant Examiner—Kim-Kwok Chu
Attorney, Agent, or Firm—Limbach & Limbach L.L.P.

[57] ABSTRACT

A method and an apparatus for transmitting digital signals are disclosed. The input digital signal is converted into a plurality of blocks each having a finite time width and an finite frequency width. Signal components of at least some of the blocks are processed in a non-linear fashion, and the resulting non-linearly processed signal components are quantized. A recording medium on which encoded digital signals are recorded is also disclosed.

36 Claims, 13 Drawing Sheets

U.S. PATENT DOCUMENTS

| | | | |
|---|---|---|---|
| 4,573,187 | 2/1986 | Bui et al. | 381/43 |
| 4,622,598 | 11/1986 | Doi et al. | 360/22 |
| 4,625,286 | 11/1986 | Papamichalis et al. | 364/513.5 |
| 4,697,212 | 9/1987 | Osawa et al. | 360/48 |
| 4,706,265 | 11/1987 | Furukawa | 375/122 |
| 4,713,776 | 12/1987 | Araseki | 364/513.5 |
| 4,748,579 | 5/1988 | Zibman et al. | 364/736 |
| 4,873,589 | 10/1989 | Inazawa et al. | 360/53 |
| 4,882,754 | 11/1989 | Weaver et al. | 381/35 |
| 4,885,790 | 12/1989 | McAulay | 381/36 |
| 4,903,301 | 2/1990 | Kondo et al. | 381/30 |
| 4,912,763 | 3/1990 | Galand et al. | 381/31 |
| 4,932,062 | 6/1990 | Hamilton | 381/43 |
| 4,949,383 | 8/1990 | Koh et al. | 381/31 |
| 4,964,166 | 10/1990 | Wilson | 381/34 |
| 5,016,107 | 5/1991 | Sasson et al. | 358/209 |
| 5,040,217 | 8/1991 | Brandenburg et al. | 381/47 |
| 5,109,417 | 4/1992 | Fielder et al. | 381/36 |
| 5,115,240 | 5/1992 | Fujiwara et al. | 381/37 |
| 5,128,963 | 7/1992 | Akagiri | 375/25 |
| 5,142,656 | 8/1992 | Fielder et al. | 381/37 |
| 5,150,387 | 9/1992 | Yoshikawa | 375/122 |
| 5,159,611 | 10/1992 | Tomita et al. | 375/34 |
| 5,185,800 | 2/1993 | Mahieux | 381/29 |
| 5,204,677 | 4/1993 | Akagiri et al. | 341/118 |
| 5,218,561 | 6/1993 | Iwadare | 364/725 |
| 5,222,189 | 6/1993 | Fielder | 395/2 |
| 5,235,671 | 8/1993 | Mazor | 395/2 |
| 5,241,603 | 8/1993 | Akagiri et al. | 381/37 |
| 5,243,588 | 9/1993 | Maeda et al. | 369/54 |
| 5,264,846 | 11/1993 | Oikawa | 341/76 |
| 5,268,685 | 12/1993 | Fujiwara | 341/76 |
| 5,285,476 | 2/1994 | Akagiri et al. | 375/25 |
| 5,294,925 | 3/1994 | Akagiri | 341/50 |
| 5,299,240 | 3/1994 | Iwahashi et al. | 375/122 |
| 5,301,205 | 4/1994 | Tsutsui et al. | 375/1 |
| 5,311,561 | 5/1994 | Akagiri | 375/122 |
| 5,375,189 | 12/1994 | Tsutsui | 395/2.38 |
| 5,381,143 | 1/1995 | Shimoyoshi et al. | 341/51 |
| 5,388,093 | 2/1995 | Yoshida et al. | 369/124 |
| 5,388,209 | 2/1995 | Akagiri | 395/2.38 |
| 5,394,508 | 2/1995 | Lim | 395/2.38 |
| 5,406,428 | 4/1995 | Suzuki | 360/53 |
| 5,438,643 | 8/1995 | Akagiri et al. | 395/2.35 |
| 5,454,011 | 9/1995 | Shimoyoshi | 375/240 |
| 5,461,378 | 10/1995 | Shimoyoshi et al. | 341/51 |
| 5,471,558 | 11/1995 | Tsutsui | 395/2.28 |
| 5,490,130 | 2/1996 | Akagiri | 369/124 |
| 5,530,750 | 6/1996 | Akagiri | 380/4 |
| 5,548,574 | 8/1996 | Shimoyoshi et al. | 395/2.13 |
| 5,553,193 | 9/1996 | Akagiri | 395/2.38 |

OTHER PUBLICATIONS

Perceptual Transform Coding of Wideband Stereo Signals, James D. Johnston, ICASSP May 23–26, 1989, vol. 3, pp. 1993–1996.

Signal Compression: Technology Targets and Research Directions, Nikil Jayant, IEEE on selected area in communication vol. 10, No. 5, pp. 796–818, Jun. 1982.

Subband/Transform Coding Using Filter bank Designs Based on Time Domain Aliasing Cancellation, Princen et al., 1987 ICCC, vol. 4 pp. 2161–2164, ICASSP, Apr. 6–9, 1987.

"Adaptive Transform Coding With an Adaptive Block Size (ATC–ABS)" —Sugiyama et al., ICASSP 90 vol. 2, Apr. 3–6, 1990 IEEE—pp. 1093–1096.

BIT ALLOCATION OF DIGITAL AUDIO SIGNAL BLOCKS BY NON-LINEAR PROCESSING

BACKGROUND OF THE INVENTION

1. Field of the Invention

This invention relates to a digital signal processing device and method for recording or transmitting compressed data produced on bit compression of digital audio signals or the like, and a recording medium having recorded thereon the compressed data produced by the digital signal processing method. More particularly, it relates to a digital signal processing method and device for handling digital audio signals including high tonality signals, and a recording medium.

2. Description of the Related Art

The present Assignee has already proposed in U.S. patent application Ser. No. 08/171,283 now U.S. Pat. No. 5,521,900, issued on May 28, 1996, JP Patent Kokai JP-A-4-105270, U.S. Pat. No. 5,243,588 and in U.S. Pat. No. 5,244,705 a technique of bit-compressing input digital audio signals and recording the bit-compressed signals on a recording medium in a burst fashion with a pre-set data quantity as a recording unit.

In the U.S. Pat. No. 5,521,900, there is described a disc recording device comprised of a disc having data indicating the recording contents in a data region as main data in a lead-in region having sub-coded table-of-contents data indicating the recording position of the data region recorded thereon, and means for recording data on the disc. There is also disclosed a disc reproducing apparatus comprised of means for reproducing data on the disc and means for making display corresponding to the display data produced by the reproducing means. In the JP Patent Kokai JP-A-4-105270, there is disclosed a disc recording device which is comprised of memory means on which continuous input data is sequentially written and from which the input data written thereon is sequentially read out as recording data at a readout rate faster than the transfer rate for input data, driving means for rotationally driving the disc-shaped recording medium at a commutable rate, means for recording data read out from the memory means on the disc-shaped recording medium, memory control means for sequentially reading the input data recorded in the memory means in a pre-set quantity when the input data quantity recorded on the memory means exceeds a predetermined quantity for maintaining a writing space in the memory means in more than a pre-set data quantity, and recording control means for controlling the recording position for continuously recording the recording data sequentially discontinuously read out from the memory means on the recording tracks on the disc-shaped recording medium under control by the memory control means. There is also disclosed a corresponding device for reproducing data recorded on the disc-shaped recording medium. In the U.S. Pat. No. 5,243,588, there is disclosed a disc recording device having memory means for transiently storing digital data and recording means for recording digital data from the memory means on a disc-shaped recording medium by clustering the digital data from the memory means at an interval of a pre-set number of sectors, providing a cluster-linking sector having a length longer than the interleaving length at each connecting portion of the clusters, and interleaving the digital data. There is also disclosed a corresponding device for reproducing data recorded on the disc-shaped recording medium. In the U.S. Pat. No. 5,244,705, there is described a disc-shaped recording medium having compresses audio data etc., recorded thereon, in which, if the inner diameter of the recording region of the disc-shaped recording medium is in a pre-set range of from 32 to 50 mm, the outer diameter of the recording region is set to 60 to 62 mm and to 71 to 73 mm for the inner diameter of the disc recording region of 32 mm and 50 mm, respectively, whereby the recording medium may be used for a small-sized portable disc recording/reproducing device and whereby the reproducing time on the order of that of a standard 12 cm CD may be achieved by recording compressed audio data at a compression ratio of ¼.

With such technique, a magneto-optical disc is used as a recording medium, and adaptive differential (AD) PCM audio data, as prescribed in an audio data format of so-called CD-I (CD-Interactive) or a CD-ROM XA, is recorded and reproduced. The ADPCM audio data is recorded on the magneto-optical disc in a burst fashion using e.g., 32 sectors of the ADPCM audio data and several linking sectors for an interleaving operation as a recording unit.

Several modes may be selected with the ADPCM audio data in the recording/reproducing device employing the magneto-optical disc. For example, there are prescribed a mode having a level A having a sampling frequency of 37.8 kHz with a compression ratio which is twice as compared with the reproducing time of a conventional compact disc (CD), a mode having a level B having a sampling frequency of 37.8 kHz with a compression ratio which is four times as compared with the reproducing time of the compact disc and a mode having a level C having a sampling frequency of 18.9 kHz with a compression ratio which is eight times as compared with the reproducing time of the compact disc.

That is, with the above level B, the digital audio data are compressed to approximately ¼, such that the play time of the disc recorded with the level B mode is four times that of the standard CD format (CD-DA format). Since the recording/reproducing time may be on the same order as that of a small sized disc having a standard diameter of 12 cm, the recording/reproducing device may be reduced in size.

However, with the recording/reproducing device employing the magneto-optical disc, since the rotational speed of the disc is the same as that of a standard CD, the amount of the compressed data obtained with the level B per pre-set time is four times that of the standard CD. Consequently, the same compressed data is read in superimposition four times, in a time unit of e.g., a sector or a cluster, and only one of the four superimposed compressed data is transmitted to audio reproduction. Specifically, during scanning or tracking a spiral recording track, track jump of returning the optical pickup to the starting track position is performed for each revolution for repeatedly tracing the same track four times on end by way of reproduction. This indicates that at least one sound compressed data of the four superposed reading operations suffices and hence the disclosed technique is strong against errors otherwise caused by disturbances and consequently may be desirably applied above all to a small-sized portable type device.

Besides, a semiconductor memory is scheduled to be employed in future as a recording medium. For further improving the compression efficiency, it is desirable to achieve further bit compression. Specifically, audio signals are recorded and/or reproduced using a so-called IC card, on or from which bit-compressed data is recorded or reproduced, respectively.

With the IC card, employing the semiconductor memory, the increase in the storage capacity or low costs are achieved with the progress in the semiconductor technology. Notwithstanding, at an earlier stage when the IC card has started to be supplied to the market, it is thought to be short of the storage capacity and expensive. Therefore, it may be contemplated to transfer the recording contents of an inexpensive large-capacity recording medium, such as the magneto-optical disc, to the IC card by way of performing frequent re-writing operations. Specifically, desired ones of musical numbers recorded on the magneto-optical disc are dubbed to the IC card and exchanged with other musical numbers in a desired manner. By frequently re-writing the contents of the IC card in this manner, performance of a wide variety of musical numbers may be enjoyed outdoors with a small number of IC cards on hand.

The present Assignee has already proposed in our European Patent Application (Publication Number: 0525809 A2; date of publication, 03 02 93) an encoding method suitable for generating the above-mentioned compressed data.

The present Assignee has also proposed in our European Patent Application (Publication Number: 0599719 A1; date of publication, 01 06 94), European Patent Application (Publication Number: 0601566 A1; date of publication, 15 06 94) and in our International Publication Number: WO 94/19801 (International Publication Date: 1 Sep. 1994) a recording/reproducing system suitable for recording/reproduction, in which the above-mentioned IC card is utilized.

If, with a view to prolonging the recording time, the bit rate for high efficiency encoding is lowered, deterioration in the sound quality becomes gradually outstanding, as is most pronounced with music signals wherein acoustic effects are critical.

OBJECT AND SUMMARY OF THE INVENTION

In view of the foregoing, it is an object of the present invention to provide a digital signal processing method and apparatus whereby the sound more spontaneous and amiable to ears may be produced without complicating the algorithm in case of lowering the bit rate for high efficiency encoding with a view to prolonging the recording time.

It is another object of the present invention to provide a recording medium having compressed data produced by the digital signal processing method and apparatus recorded thereon.

In its one aspect, the present invention provides a digital signal processing method for transmitting a digital signal including converting the input digital signal into a plurality of blocks each having a finite time width and an finite frequency width, non-linearly processing signal components of at least some of the blocks, and quantizing the non-linearly processed signal components.

In another aspect, the present invention provides a digital signal processing apparatus for transmitting a digital signal including means for converting a digital input signal into signal components in a plurality of blocks each having a finite time width and a finite frequency width, non-linear processing means for non-linearly processing the signal components in at least some of the blocks, and encoding means for quantizing the non-linearly processed signal components.

In a further aspect, the present invention provides a recording medium having an encoded digital signal recorded thereon. Such recording medium is prepared by the steps of converting the input digital signal into a plurality of blocks each having a finite time width and an finite frequency width, non-linearly processing signal components of at least some of the blocks, quantizing the non-linearly processed signal components for generating recording data, and recording the recording data on the recording medium.

With the method and apparatus for processing digital signals and the recording medium according to the present invention, the input digital signal is converted into a plurality of blocks each having an finite time width and a finite frequency width and containing a plurality of signal components. The signal components of at least some of the plural blocks are non-linearly processed and the thus non-linearly processed signal components are quantized for producing data which has been non-linearly processed insofar as the blocks containing high tonality signals are concerned.

Also, with the method and apparatus for processing digital signals and the recording medium according to the present invention, it becomes possible to reduce the effects the quantization noise has on the sound quality by increasing the magnitude of the spectral component if the magnitude difference from the spectral component having the maximum value in the block for block floating is small, or by reducing the quantization level to zero if such magnitude difference is larger, despite the insufficient signal-to-noise ratio due to shortage in the allocated bits. Thus it becomes possible with the present invention to reduce the quantization noise for high tonality sound signals in the floating block used for high efficiency encoding, such as the trumpet sound, thereby diminishing deterioration in the sound quality.

DESCRIPTION OF THE PREFERRED EMBODIMENTS

Figure 1:
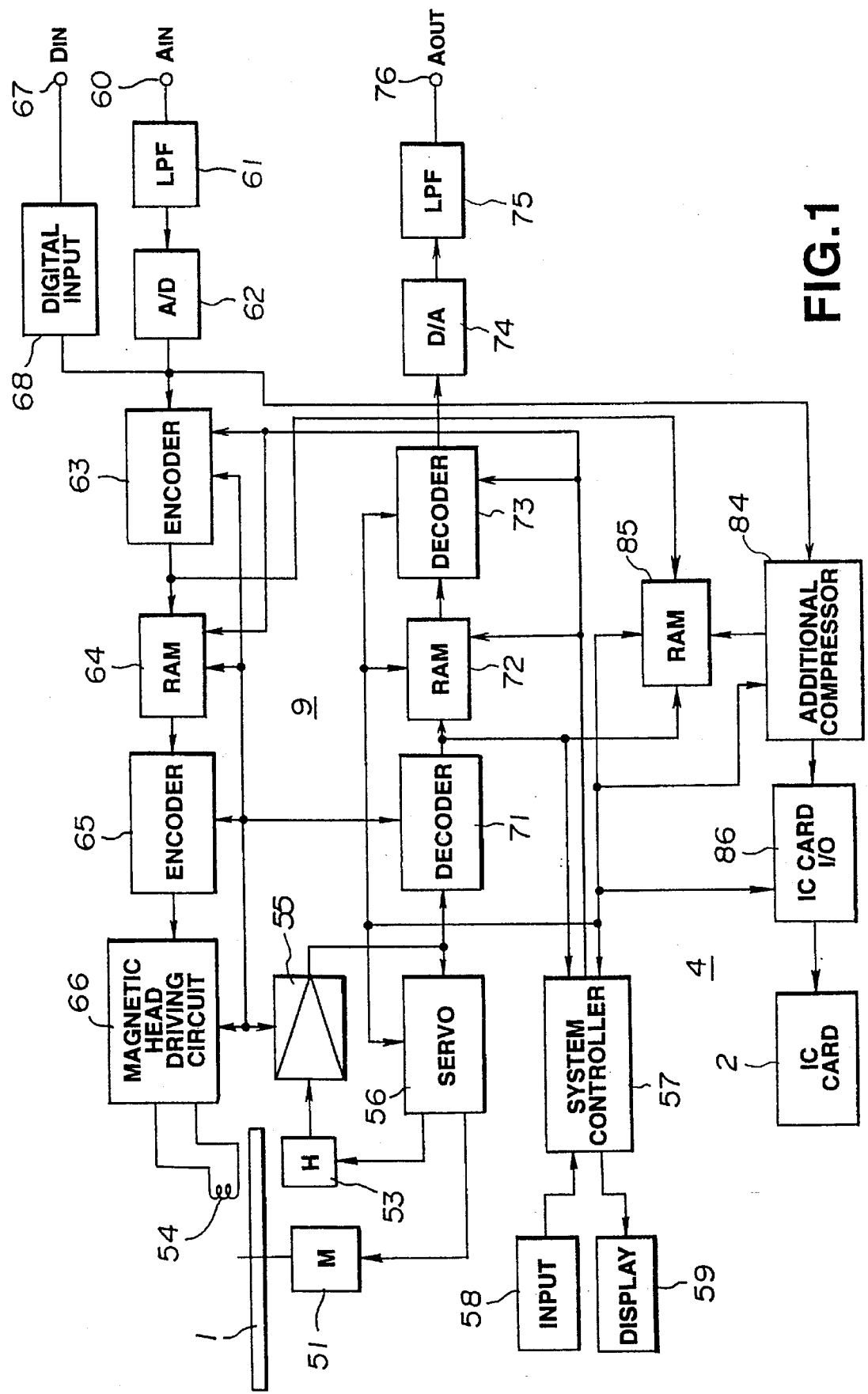
FIG. 1 is a schematic block circuit diagram showing an arrangement of a disc recording/reproducing device for practicing the digital signal processing method of the present invention.

Preferred embodiments of the present invention will be hereinafter explained by referring to the drawings.

FIG. 1 schematically shows, as an example of a digital signal processing device according to the present invention, an embodiment of a compressed data recording/reproducing device for recording/reproducing bit-compressed digital audio data on a recording medium.

The recording/reproducing device shown in FIG. 1 includes a recording/reproducing unit for a magneto-optical disc 1 as typical of the recording media and an IC card recording unit for writing/reading compressed data on or from an IC card 2 as another recording medium, with the two units shown as being arranged into one system.

When recording signals reproduced from the magneto-optical disc by the reproducing system of the recording/reproducing unit for the magneto-optical disc by the IC card recording unit, reproduced compressed data is read by an optical head 53 from the magneto-optical disc 1 of the reproducing system, and sent to a decoder 71 for EFM decoding, deinterleaving or error correction to produce reproduced compressed data, which is sent to and transiently stored in a memory 85 of the IC card recording unit. The reproduced compressed data, read from the memory 85, is processed with addition of a variable bit rate encoding etc., by an additional compression unit 84 designed to perform an additional operation of entropy coding. The resulting encoded audio data is then recorded on the IC card 2 via an IC card interfacing circuit 88. Thus the reproduced compressed data from the magneto-optical disc 1 is transmitted to the recording system for recording on the IC card 2 in a compressed state prior to decoding by an ATC decoder 73.

Meanwhile, for usual playback, that is for audition, compressed data is intermittently read from the recording medium (magneto-optical disc 1) in a burst fashion with a pre-set amount of data, for example, 32+several sectors, as a unit, and is expanded for conversion into continuous audio signals. During dubbing, compressed data on the magneto-optical disc i is continuously read and transmitted to the IC card recording unit for recording. High-speed or short-term dubbing may be performed in this manner depending on the data compression ratio.

The practical arrangement of the compressed data recording/reproducing device shown in FIG. 1 is explained in detail.

In the magneto-optical disc recording/replay unit of the compressed data recording and/or reproducing device, shown in FIG. 1, the magneto-optical disc i run into rotation by a spindle motor 51 is employed as a recording medium. In recording data on the magneto-optical disc 1, a modulated magnetic field corresponding to recording data is applied by a magnetic head 54, while the magneto-optical disc 1 is irradiated with a laser light beam by the optical head 53, by way of performing the recording by magnetic field modulation. In this manner, data may be recorded along a recording track of the magneto-optical disc 1. In reproducing the recorded data, the recording track on the magneto-optical disc 1 is traced by a laser light beam for photomagnetic data reproduction.

The optical head 53 is made up of a laser light source, such as a laser diode, optical components, such as a collimator lens, an objective lens, a polarized light beam splitter or a cylindrical lens, and a photodetector having a light receiving section having a pre-set pattern. The optical head 53 is placed at a position of facing the magnetic head 54 with the magneto-optical disc 1 in-between. For recording data on the magneto-optical disc 1, the magnetic head 54 is driven by a head driving circuit 66 of a recording system for applying a modulated magnetic field corresponding to the recording data to the disc 1, while a laser light beam is radiated by the optical head 53 on a target track of the magneto-optical disc 1 for thermo-magnetic recording in accordance with the magnetic field modulating recording system. Besides, the optical head 53 detects the reflected laser light from the target track for detecting the focusing error by an astigmatic method, while detecting the tracking error by a push-pull method. When reproducing data from the magneto-optical disc 1, the optical head 53 detects the focusing error or the tracking error, while also detecting the difference in the angle of polarization (the Kerr rotation angle) of the reflected light from the target track for generating playback signals.

An output of the optical head 53 is supplied to an RF circuit 55 which extracts the above-mentioned focusing error signals and the tracking error signals from an output of the optical head 53 to transmit the extracted signals to a servo control circuit 56. The RF circuit 55 also converts the playback signals into bi-level signals which are supplied to a decoder 71 of the reproducing system.

The servo control circuit 56 is made up of, for example, a focusing servo control circuit, a tracking servo control circuit, a spindle servo control circuit, a thread servo control circuit and so forth. The focusing servo control circuit focusing-controls the optical system of the optical head 53 so that the focusing signal is reduced to zero. The tracking servo control circuit tracking-controls the optical system of the optical head 53 so that the tracking signal is reduced to zero. The spindle motor servo controlling circuit controls the spindle motor 51 for running the magneto-optical disc 1 into rotation at a pre-set rotational velocity, for example, at a constant linear velocity. The thread servo control circuit shifts the optical head 53 and the magnetic head 54 to a target track position of the magneto-optical disc 1 as designated by a system controller 57. The servo control circuit 56 transmits the information indicating the operating states of the various components controlled by the servo control circuit 58 to the system controller 57.

A key input unit 58 and a display 59 are connected to the system controller 57 which controls the recording system and the reproducing system under the operating mode as designated by the input information entered at the key input unit 58. The system controller 57 also supervises the recording position and the playback position on the recording track traced by the optical head 53 and the magnetic head 54 based on the sector-based address information reproduced from the recording track of the magneto-optical disc 1 by Q-data such as header time or sub-code data. Besides, the system controller 57 causes the bit compression mode to be displayed in the display 59, based on the bit compression mode information at an encoder 63, as selected by the key input unit 58 and on the compression mode information in the playback data as obtained from the RF circuit 55 via a reproducing system, while causing the playback time to be displayed on the display 59 based on the data compression ratio in the bit compression mode and the playback position information on the recording track.

For playback time display, the sector-based address information (absolute time information) reproduced from the recording track of the magneto-optical disc 1 by header time or sub-code Q data is multiplied by a reciprocal of the data compression ratio for the bit compression mode, such as 4 for the bit compression ratio of ¼, to find the actual time information, which is displayed on the display 59. Meanwhile, during recording, if the absolute time information is pre-recorded on the recording track of the magneto-optical disc 1, that is if the magneto-optical disc 1 is pre-formatted, the current position may be displayed as the actual recording time by reading the pre-formatted absolute time information and multiplying it with a reciprocal of the data compression ratio.

In a recording system of the compressed data recording/reproducing device, analog audio input signals AIN are supplied from an input terminal 60 via a low-pass filter 61 to an A/D converter 62 which quantizes the analog audio input signals AIN by pulse code modulation (PCM). The digital audio input signals from the A/D converter 62 are supplied to an adaptive transform coding (ATC) PCM encoder 63. On the other hand, digital audio input signals DIN from an input terminal 67 are supplied to an ATC encoder 63 via a digital input interfacing circuit 68. The ATC encoder 63 performs bit compression (data compression), in a manner of dealing with various modes of the ATC system shown in Table 1, on the digital audio PCM data of the pre-set transfer rate, which is the above-mentioned input signal AIN quantized by the A/D converter 62, or on the digital audio signals supplied via the digital/input interfacing circuit 68. The ATC encoder 63 has its operating mode designated by the system controller 57. For the B-mode, as an example, the data is the compressed data having the sampling frequency of 44.1 kHz and the bit rate of 64 kbps (ATC data) and is supplied to a memory 64. The data transfer rate for the stereo B mode is reduced to one-eighth of the data transfer rate for the standard CD-DA format of 75 sectors per sec, or to 9.375 sectors per sec.

TABLE 1

| | SAMPLING FREQUENCY = 44.1 kHz | | |
| --- | --- | --- | --- |
| MODE | BIT RATE kps/channel | BAND WIDTH kHz | MAXIMUM PROCESSING BLOCK LENGTH msec |
| A | 128 | 22 | 11.6 |
| B | 64 | 13 | 23.2 |
| C | 32 | 5.5 | 34.8 |
| D | 16 | 3 | 46.4 |

In the embodiment of FIG. 1, it is assumed that the sampling frequency of the A/D converter 62 is fixed at the sampling frequency of the standard CD-DA format of 44.1 kHz, and that the sampling frequency is maintained in the ATC encoder 63 to perform bit compression. The lower the bit rate of the mode, the narrower becomes the signal pass band. Consequently, the cut-off frequency of the low-pass filter 61 is changed over in a corresponding manner. That is, it suffices to simultaneously control the cut-off frequency of the low-pass filter 62 depending on the compression mode.

The memory 64 is a buffer memory which is controlled as to data writing and data reading by the system controller 57 for transiently storing the compressed audio data (ATC audio data) supplied from the ATC encoder 63 for recording on the disc as the occasion may demand. That is, for the stereo B mode, the compressed audio data supplied from the ATC encoder 63 has its data transfer rate diminished to one-eighth of the data transfer rate for the standard CD-DA format of 75 sector per sec, or to 9.375 sectors per sec. The compressed data is written continuously on the memory 64. Although it suffices to record the ATC data at a rate of one per eight sectors, as previously described, such recording at every eight sectors is practically impossible, so that sector-continuous recording is performed, as will be explained subsequently.

This recording is performed in a burst fashion at the data transfer rate of 75 sectors per second, which is the same as the standard CD-DA format, with a cluster made up of pre-set plural sectors, for example, 32+several sectors, as a recording unit, with the interposition of a non-recording period. That is, in the memory 64, the stereo B mode ATC audio data, continuously written at a low transfer rate of 9,375 (=75/8) sectors per sec, associated with the bit compression mode, is read as the recorded data in a burst fashion at the above-mentioned transfer rate of 75 sectors per second. The overall data transfer rate of the data read out and recorded, inclusive of the non-recording period, is the low rate of 9.375 sectors per sec. However, the instantaneous data transfer rate within the time period of the recording operation which is performed in a burst fashion is the above-mentioned standard data transfer rate of 75 sectors per sec. Therefore, if the disc rotating velocity is the same as that of the standard CD-DA format, that is a constant linear velocity, recording is made at the same recording density and with the same recording pattern as those of the CD-DA format.

The ATC audio data read from the memory 64 at the above-mentioned instantaneous transfer rate of 75 sectors per sec, that is the recorded data, are supplied to an encoder 65. The unit by which the data string supplied from the memory 64 to the encoder 65 is recorded for each recording is a cluster consisting of plural sectors, such as 32 sectors, and several cluster-linking sectors arrayed ahead and at back of the cluster. The cluster-linking sectors are selected to be longer than an interleaving length at the encoder 65 so that data of neighboring clusters are not affected by the interleaving operation.

The encoder 65 performs encoding for error correction, such as parity appendage and interleaving, or EFM encoding, on the recording data supplied from the memory 64 in the burst fashion. The recorded data encoded by the encoder 65 is supplied to a magnetic head driving circuit 66. The magnetic head 54 is connected to the magnetic head driving circuit 66 which drives the magnetic head 54 for applying the modulated magnetic field corresponding to the recording data to the magneto-optical disc 1.

The system controller 57, controlling the memory 64 as described above, also controls the recording position in such a manner that the recorded data read in the burst fashion by the memory control is continuously recorded on the recording track of the magneto-optical disc 1. The recording position is controlled by supervising the recording position of the recorded data read in the burst fashion by the system controller 57 from the memory 64 and by supplying a control signal designating the recording position on the recording track of the magneto-optical disc 1 to the servo control circuit 56.

The reproducing system of the recording/reproducing unit for the magneto-optical disc 1 is hereinafter explained.

The reproducing system is employed for reproducing the recorded data continuously recorded on the recording track of the magneto-optical disc 1, and includes a decoder 71 to which a playback output produced on tracing the recording track of the magneto-optical disc 1 with a laser light beam from the optical head 53 is supplied after conversion into bi-level data by the RF circuit 55. With the present reproducing system, recorded data may be read not only from the magneto-optical disc 1 but also from the replay-only optical disc which is of the same type as the so-called compact disc.

The decoder 71 is a counterpart of the encoder 65 of the above-described recording system, and performs the above-mentioned decoding for error correction or EFM decoding on the bi-level playback output of the RF circuit 55, while reproducing the stereo B mode ATC audio data at a transfer rate of 75 sectors per second which is faster than the normal transfer rate for the stereo B mode. The playback data obtained by the decoder 71 is supplied to a memory 72.

The memory 72 has its data writing and reading controlled by the system controller 57 in such a manner that the playback data supplied from the decoder 71 at the transfer rate of 75 sectors per sec is written therein in the burst fashion at the transfer rate of 75 sectors per sec. On the other hand, the playback data written in the burst fashion at the transfer rate of 75 sectors per sec is continuously read from the memory 72 at the normal transfer rate for the stereo B mode of 9.375 sectors per sec.

The system controller 57 controls the memory 72 in such a manner as to write the replay data in the memory 72 at the transfer rate of 75 sectors per sec and to continuously read the playback data from the memory 72 at the above-mentioned transfer rate of 9.375 sectors per sec. The system controller 57, controlling the memory 72 as described above, controls the playback position in such a manner as to continuously reproduce the playback data written in a burst fashion in the memory 72 under control by the system controller from the recording track of the magneto-optical disc 1. The playback position is controlled in such a manner that the playback position of the playback data read in the burst fashion from the memory 72 is supervised by the system controller 57 and a control signal designating the playback position on the recording track of the magneto-optical disc 1 or the optical disc is transmitted to the servo control circuit 56.

The stereo B mode ATC audio data obtained as the playback data continuously read from the memory 72 at the transfer rate of 9.375 sectors per sec is supplied to an ATC decoder 73. The ATC decoder 73 is a counterpart of the ATC encoder 63 of the recording system and has its operating mode designated by the system controller 57 in such a manner that the stereo B mode ATC audio data, for example, is expanded by a factor of eight by bit expansion for reproducing 16-bit digital audio data. The digital audio data from the ATC decoder 73 is supplied to a D/A converter 74.

The D/A converter 74 translates the digital audio data supplied from the ATC decoder 73 into analog signals for forming analog audio output signals AOUT. The analog audio output signals AOUT from the D/A converter 74 are outputted at an output terminal 76 via a low-pass filter 75.

The IC card recording unit of the compressed data recording/reproducing device is hereinafter explained.

The ATC audio data from the decoder 7 is transmitted to an additional compressing unit 84 for removal of redundant bits and zero-word-length processing.

In the present embodiment, spectral components markedly smaller than the maximum value in the block for block floating are set to zero. This operation is executed whilst data is read out from or written in the memory 85. Data from the additional compressing unit 84, encoded with a variable bit rate, is written (recorded) on the IC card 2 via an IC card interfacing circuit 86. It is of course possible with the present invention to enlarge the size of orthogonal transform or to increase the block for block floating on the frequency axis carrying the subsidiary information or the frequency width of the block subjected to quantization noise for recording at a lower constant bit rate without zero-word-length processing or executing elimination of redundant bits.

The compressed data from the decoder 71 of the reproducing system of the recording/reproducing unit for the magneto-optical disc (ATC audio data) is directly transmitted to the memory 85 of the IC card recording unit without expansion. Such data transfer is executed in order for the system controller 57 to control e.g., the memory 85 during so-called high-speed dubbing. Recording the ATC audio data with a low bit rate on the IC card 2 from the magneto-optical disc or the optical disc is convenient for recording on the IC card having high production cost per unit recording capacity. The compressed data from the memory 72 may also be transmitted to the memory 85.

The so-called high-speed digital dubbing operation is explained. During the high-speed digital dubbing, a dubbing key of the key input unit 58 is actuated for executing a pre-set high-speed dubbing under instructions issued from the system controller 57. Specifically, the compressed data from the decoder 71 is directly transmitted to the memory 85 of the IC card recording system and processed with a variable bit rate encoding by the additional compression unit 84 in order to effect recording on the IC card 2 via the IC card interfacing circuit 86. The additional compression unit executes such operations as elimination of redundant bits and zero word length processing. If the stereo B mode ATC audio data is recorded on the magneto-optical disc 1, digital audio data compressed by a factor of eight is continuously read from the decoder 71.

Consequently, during the high speed dubbing, compressed data corresponding to the time duration eight times as much as the steady-state time duration on the real time basis for the stereo B mode is continuously produced from the magneto-optical disc 1, so as to be freed of redundant bits or processed with zero-word-length processing, so that data having a constant bit rate is recorded on the IC card. In this manner, high speed dubbing eight time as high as the steady-state rate may be achieved. Meanwhile, the multiplication factor in the high-speed dubbing differs with different compression modes. High-speed dubbing at a rate higher than the multiplication factor used for compression may also be performed, in which case the magneto-optical disc 1 is rotationally driven at a velocity plural number of times faster than the steady-state velocity.

Figure 2:
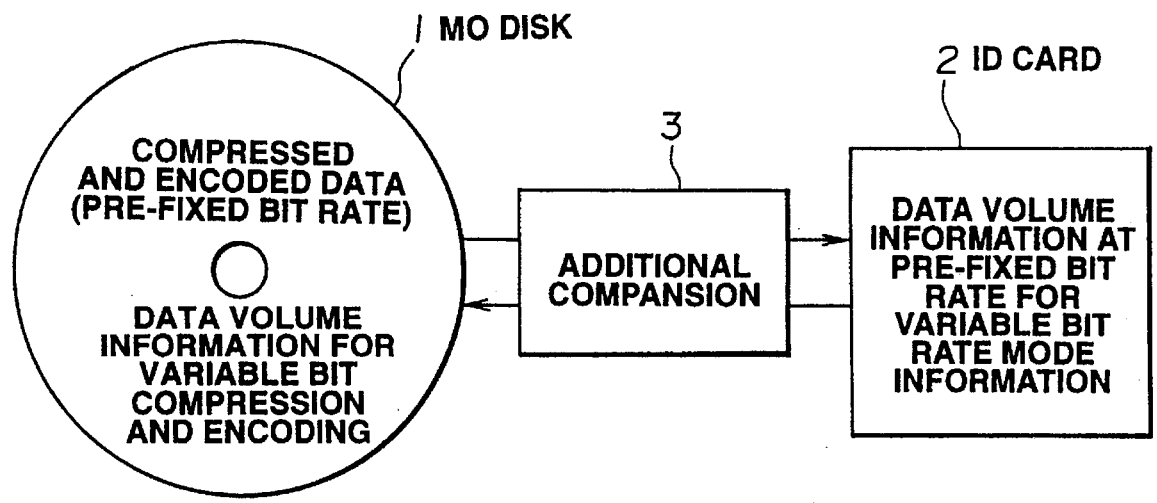
FIG. 2 is a diagrammatic view for illustrating the recording contents of a magneto-optical disc and an IC card.

It is noted that not only the compressed and encoded data but also the information concerning the data volume at the time of variable bit rate encoding and compression by the additional companding block 3 (the data recording capacity required for recording on the IC card 2) are recorded on the magneto-optical disc 1, as shown in FIG. 2. By so doing, the number of the musical numbers recorded on the magneto-optical disc I and recordable on the IC card 2, as well as possible combinations of the musical airs recordable on the IC card 2, may be instantly comprehended by reading the data volume information. The bit rate may naturally be changed within the additional companding block 3 from the fixed bit rate to a lower bit rate mode in place of employing the variable bit rate mode.

Conversely, if the information concerning the data volume at the time of bit compression and encoding at the constant bit rate, as well as the data compressed by bit compression and encoding at the variable bit rate encoding, is recorded on the IC card 2, the data volume when transmitting data, such as musical airs, from the IC card 2 to the magneto-optical disc 1, may be comprehended promptly. It is of course possible to record the data compressed and encoded at a fixed low bit rate in the IC card 2 besides the data compressed and encoded at a variable bit rate.

Figure 3:
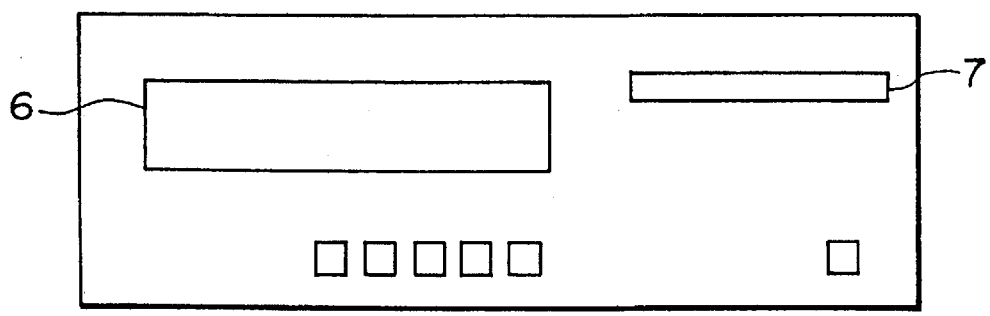
FIG. 3 is a schematic front view showing the typical appearance of the recording/reproducing device shown in FIG. 1.

FIG. 3 shows, in a front view, the compressed data recording/reproducing device 5, arranged and constructed as shown in FIG. 1. The device 5 has an inserting section 6 for a magneto-optical disc or an optical disc and an inserting slot for an IC card 7. The recording/reproducing unit for the magneto-optical disc and the IC card recording unit may naturally be arranged separately from each other and interconnected by a cable, not shown.

The high efficiency compression and encoding operation performed by the ATC encoder 63 is explained in detail. That is, the technique of performing high efficiency encoding on input digital audio signals, such as audio PCM signals, by sub-band coding (SBC), adaptive transform coding (ATC) and adaptive bit allocation, is explained by referring to FIG. 4.

In the ATC encoder 63 (high-efficiency encoding device), the frequency spectrum of the input digital signals is divided into plural frequency bands so that two neighboring lower most bands are of an equal bandwidth and the bandwidths become progressively broader in the direction of increasing frequencies. The input digital signals are orthogonally transformed from one frequency band to another to produce frequency-domain spectral data which is encoded with the numbers of bits which are adaptively allocated on the basis of so-called critical bands for the lower frequency range for taking into account the characteristics of the human aural sense as later explained and on the basis of smaller width bands sub-divided from the critical bands for the mid to high frequency range in consideration of the so-called block floating efficiency. This block usually becomes the unit subject to the quantization noise, that is the block for which the quantization noise is produced. Besides, with the present embodiment, the block size or block length is adaptively changed prior to orthogonal transform depending on input digital signals and floating is performed on the block basis.

Figure 4:
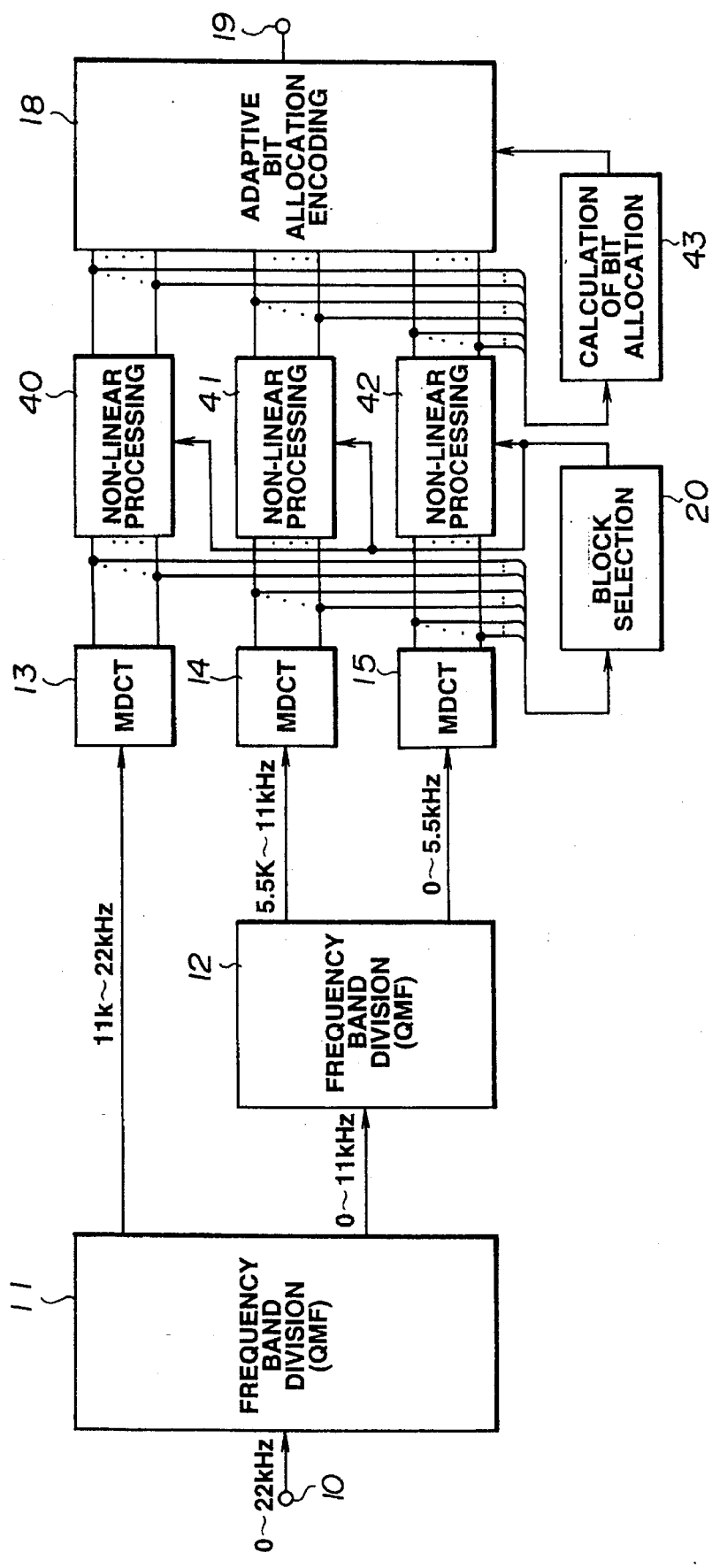
FIG. 4 is a schematic block circuit diagram showing a practical example of a high-efficiency compression and encoding device which may be employed for bit rate compression and encoding.

More specifically, audio PCM signals having a frequency range of 0 to 22 kHz, with the sampling frequency of 44.1 kHz, are supplied to an input terminal 10 (FIG. 4). These input digital signals are divided by a frequency dividing filter 11, such as, for example, a QMF filter, into signals having a frequency range of 0 to 11 kHz and a frequency range of 11 to 22 kHz. The signals having the frequency range of 0 to 11 kHz are similarly divided by a similar frequency dividing filter 12, such as a QMF filter, into signals having a frequency band of 0 to 5.5 kHz and signals having a frequency band of 5.5 kHz to 11 kHz. The signals having the frequency range of 11 to 22 kHz from the frequency dividing filter 11 are transmitted to a modified DCT (MDCT) circuit 13, while the signals having the frequency range of 5.5 to 11 kHz from the frequency dividing filter 12 are transmitted to an MDCT circuit 14 and the signals having the frequency range of 0 to 5.5 kHz from the frequency dividing filter 12 are transmitted to an MDCT circuit 15. The MDCT circuits 13 to 15 are herein recited as examples of the orthogonal transform circuit.

One of the techniques of dividing the input digital signals into plural frequency bands is by using the QMF filter. In 1976 R.E. Crochiere Digital Coding of Speech in Sub-band, Bell Syst. Tech. J. Vol. 55, No. 8 1976, there is stated a technique of division of the frequency spectrum by a filter, such as QMF.

In ICASSP 83, Boston, "Polyphase Quadrature Filters—A New subband coding technique" by Joseph H. Rothweiler, there is described a technique of dividing the frequency spectrum into equal frequency band widths.

As an example of the above-described orthogonal transform, there is such orthogonal transform in which input audio signals are divided into time blocks of pre-set length (frames) and processed with fast Fourier transform (FFT), cosine transform (DCT) or modified DCT (MDCT) for transformation of time-domain signals into frequency-domain signals. Discussions on MDCT may be found in ICASSP 1987 Sub-band/Transform Coding Using Filter Bank Designs Based on Time Domain Aliasing Cancellation J. P. Princen, A. B. Bradley Univ. of Surrey, Royal Melbourne Inst. of Tech.

Figure 5:
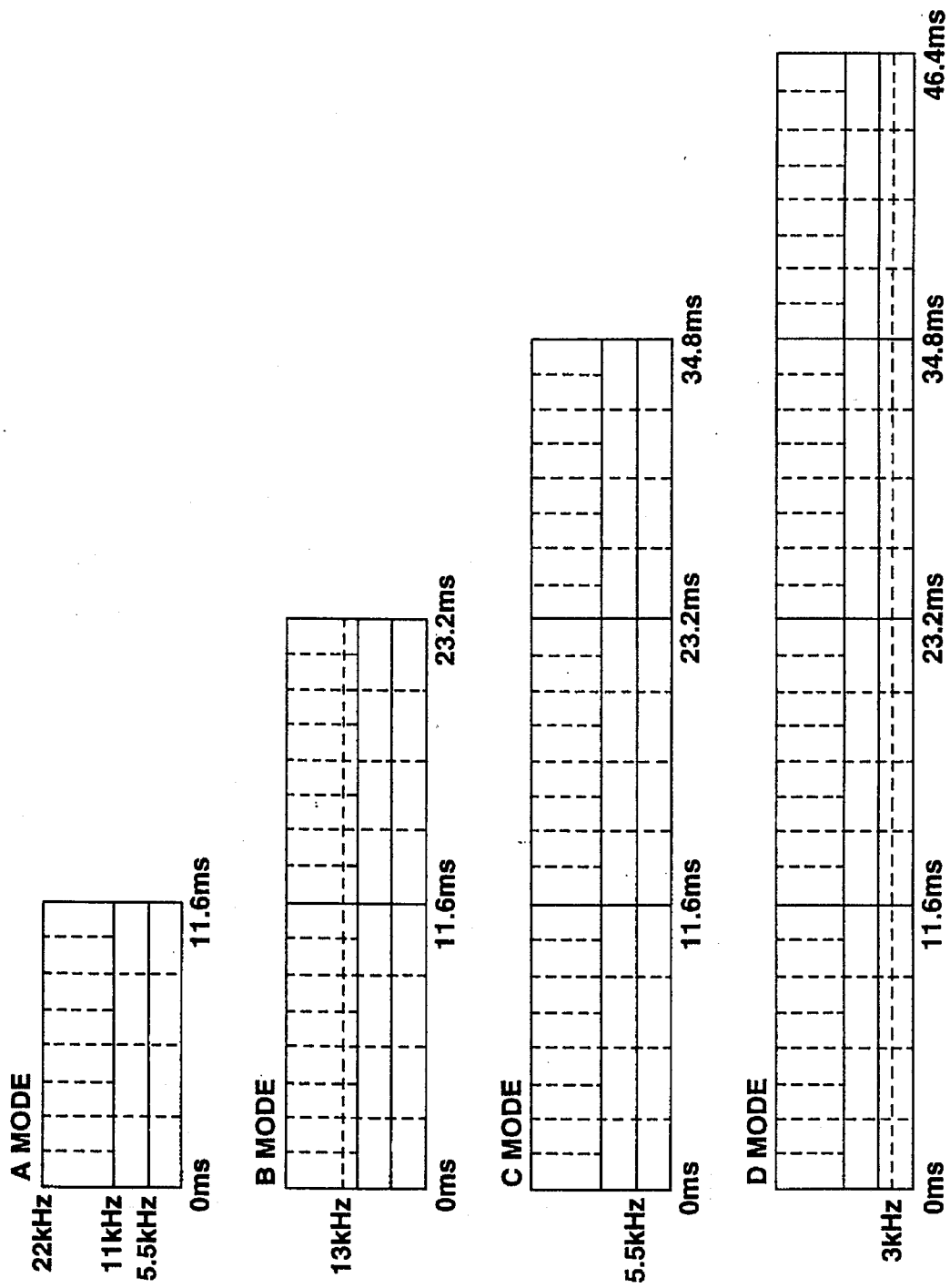
FIG. 5 is a diagrammatic view showing a data structure of a processing block for each mode of bit compression.

Specific examples of the blocks of the respective bands supplied to each of the MDCT circuits 13 to 15 in the respective modes for the standard input digital signals are shown in FIG. 5. In the specific examples of FIG. 5, each of three filter output signals from the frequency spectrum dividing filters 11 and 12 shown in FIG. 4 has its time resolution capacities changed over depending on temporal characteristics of the signals by MDCT circuit 13 to 15 each having plural orthogonal transform block sizes. Besides, the lower the bit rate, the longer becomes the time duration of the largest processing blocks and the narrower becomes the signal pass band.

That is, for the A-mode, as shown in FIG. 5, if the signals are quasi-stationary, the orthogonal transform block size is enlarged to 11.6 msec, whereas, if the signals are non-stationary, the orthogonal transform block size is further divided by four and by eight for the frequency band not higher than 11 kHz and for the frequency band higher than 11 kHz, respectively.

For the B mode, the time duration of the largest orthogonal transform block becomes twice as long as that for the A mode and becomes equal to 23.2 msec, with the signal pass band width becoming narrow up to 13 kHz. Besides, if the signal is temporally quasi-stationary, the orthogonal transform block size remains as large as 23.2 msec, whereas, if the signals are non-stationary, the signals are divided into two each having a time duration of 11.6 msec. If the signals become more non-stationary, the orthogonal transform block size is further divided by four and by eight for the frequency band not higher than 11 kHz and for the frequency band higher than 11 kHz, respectively, as shown in FIG. 5, so that the block size is ultimately divided by eight and sixteen, respectively.

For the C-mode, the time duration of the maximum orthogonal transform block is up to 34.8 msec, while the pass band is limited to 5.5 kHz.

For the D-mode, the time duration for the orthogonal transform block is set to 46.4 msec.

It is noted that the time duration of the largest orthogonal transform block is doubled only for lower bands in each of the MDCT circuits 13 to 15, for facilitating bit rate conversion from the A mode to the B mode. That is, the low-frequency side orthogonal transform for the A mode is inverse orthogonal transformed and subsequently orthogonal transformed with twice the size of the orthogonal transform block. Such operation may be achieved more easily than inverse orthogonal transform of the signals of plural bands of the entire frequency spectrum followed by band-based orthogonal transform. Besides, the operation is convenient in executing high-speed transfer from the magneto-optical disc to the IC memory card simultaneously with conversion from the A-mode to the B-mode. The reason therefor is that the high range acoustic signals experience temporal fluctuations more significant than those of the low range acoustic signals, and a lower signal to noise ratio suffices for the high range acoustic signals.

Meanwhile, at this time, the signal pass band is up to 13 kHz. In such case, the filter output signals prior to the orthogonal transform in the frequency range of from 11 kHz to 22 kHz are sub-sampled by ½ or ¼ for avoiding wasteful signal processing for the frequency bands having the frequency range higher than the pass band.

As the mode proceeds to the C- and D-modes, the time duration for orthogonal blocks becomes longer to enable the signal pass band to be reduced. It is of course unnecessary for the time block duration and the signal pass band to differ from one mode to another, such that the same block duration and the same pass band may occasionally be employed.

If it is desired to diminish the time delay despite the longer length of the largest orthogonal transform block for the lower bit rate, it is sufficient to selectively employ smaller sizes of the orthogonal transform blocks which are proper to the mode for orthogonal transform.

Returning to FIG. 4, the frequency-domain spectral data (spectral components) or MDCT coefficient data, produced on MDCT by the MDCT circuits 13 to 15 for the A-mode, are grouped according to the critical bands for the lower frequencies, and are sub-divided from the critical bands for higher efficiency for block floating for the mid to high frequency ranges, before being transmitted to an adaptive bit allocation and encoding circuit 18. The critical bands mean the frequency bands divided from the audible frequency range in order to take into account psychoacoustic characteristics of the human aural sense. Thus, each critical band is the band of a narrow-band noise masking a pure tone having a frequency in the vicinity of the frequency of the noise and the same intensity as the noise. The critical bands become broader in the direction of the increasing frequencies. The audible frequency range of from 1 to 22 kHz is divided into, for example, 25 critical bands.

As for the B-mode, if a signal having the orthogonal transform block size not equal to twice that for the A-mode is non-stationary, the frequency width of the block having the subsidiary information for quantization is selected to be twice that for the A-mode, for example, for halving the number of the blocks and diminishing the volume of the subsidiary information for quantization. Thus, by doubling the orthogonal transform block size for the lower frequency range and by increasing the frequency width of the block having the subsidiary information for quantization for other frequency ranges, the volume of the subsidiary information for quantization may be diminished for the total frequency range.

The bit allocation calculating circuit 43 calculates, based on the critical bands and spectral data divided to take into account the block floating, the signal energy or peak values for each critical band and each band divided from the critical band in order to take into account the block floating in view of the masking effect. Besides, the bit allocation calculating circuit 43 calculates the signal energy or the peak values for each of the critical bands and the bands divided from the critical bands in order to take the block floating into account, and calculates the numbers of allocated bits for the respective bands, based on the signal energy or peak values for each of the critical bands and the bands divided from the critical bands, and on the amounts of masking, and transmits the resulting information to the adaptive bit allocation and encoding circuit 18. The adaptive bit allocation and encoding circuit 18 normalizes and quantizes the spectral data or the MDCT coefficient data depending on the numbers of bits allocated to the respective bands. The data encoded in this manner is outputted at an output terminal 19.

Figure 6:
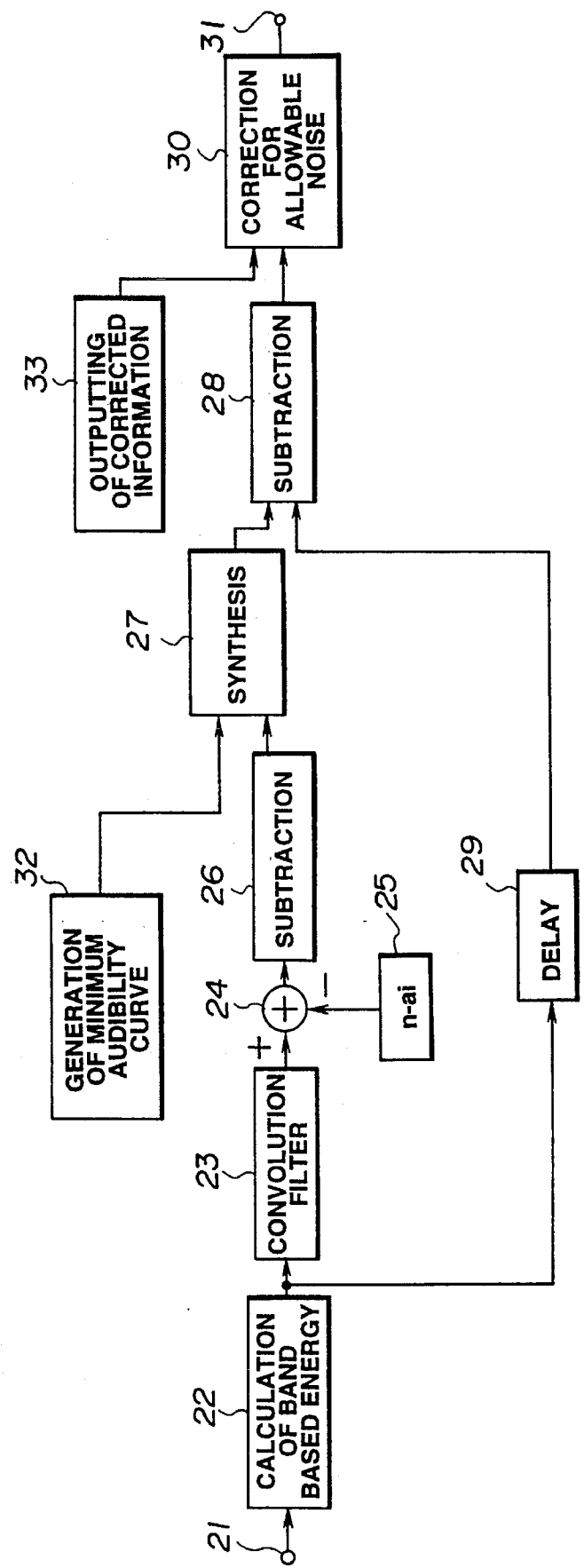
FIG. 6 is a block circuit diagram showing a practical circuit for performing arithmetic-logical operations for bit allocation.

FIG. 6 shows, in a schematic block circuit diagram, an arrangement of a concrete embodiment of the bit allocation calculating circuit 43, in which the frequency-domain spectral data from the MDCT circuits 13 to 15 are supplied to an input terminal 21.

Figure 7:
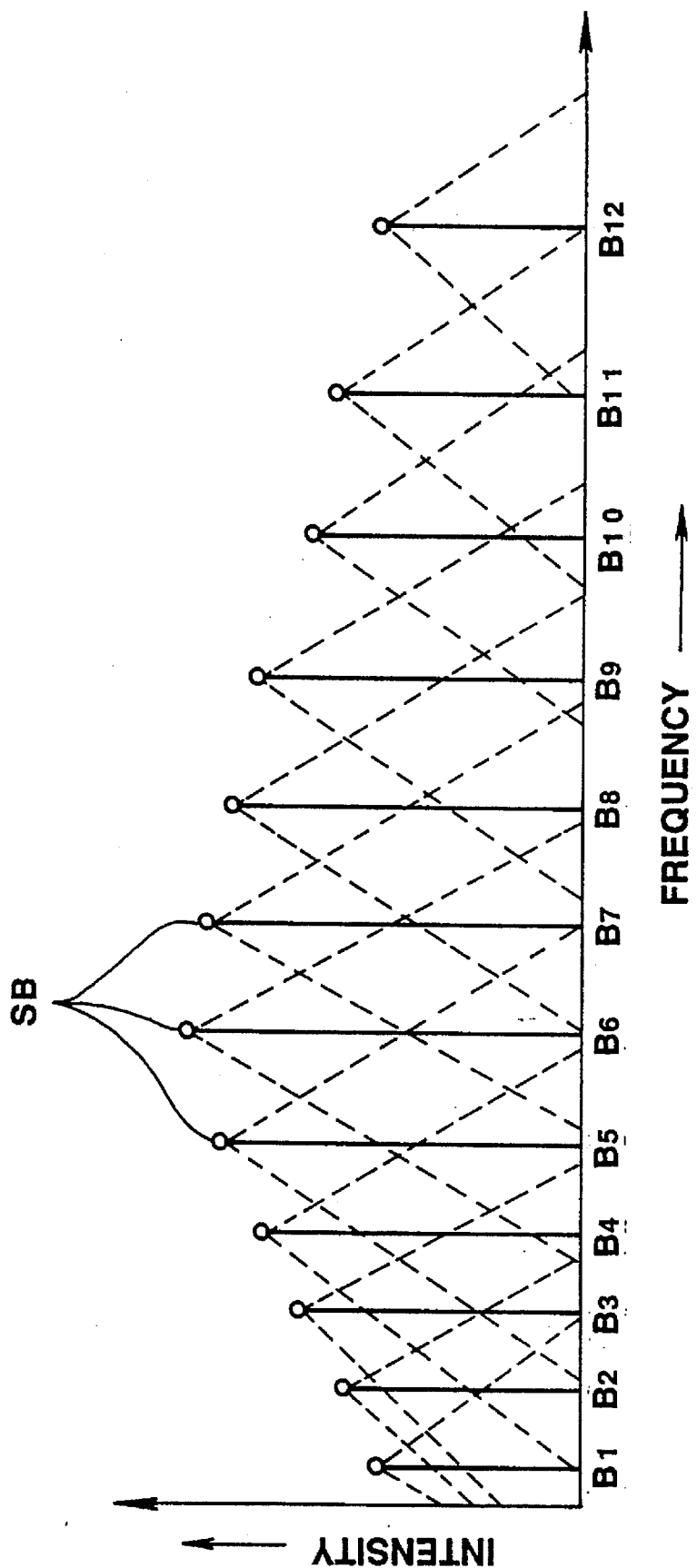
FIG. 7 is a graph for showing the spectrum of frequency bands as set in order to take into account the critical bands and block floating.
Figure 8:
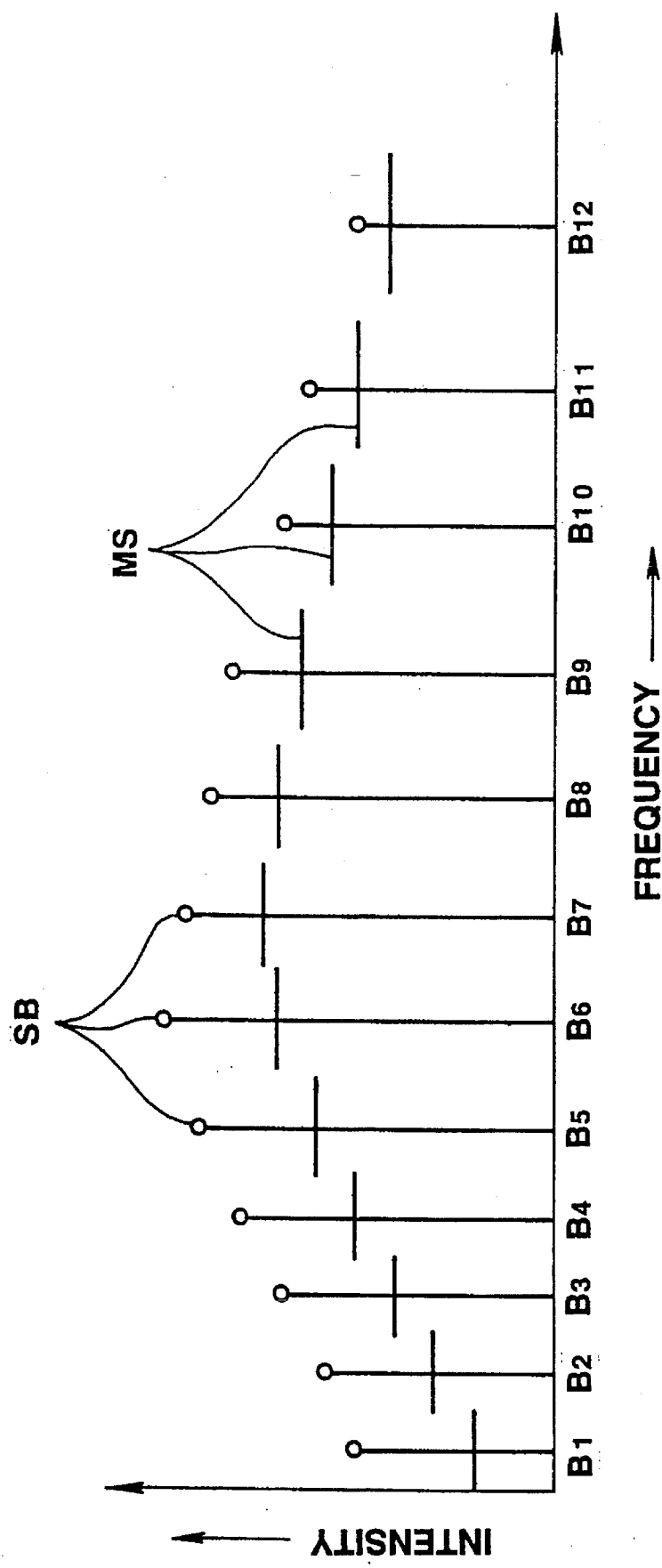
FIG. 8 is a graph showing the masking spectrum.

The frequency-domain spectral data is transmitted to a band-based energy calculating circuit 22 in which the energies of the critical bands and the bands divided from the critical bands in order to take into account the block floating are found by calculating the sum total of the amplitudes of the spectral components in the respective bands. The amplitude peak values or mean values may also be employed in place of signal energy in the respective bands. Each spectral component indicating the sum value of each of the respective bands is indicated as SB in FIG. 7 as an output of the energy calculating circuit 22. In FIG. 7, 12 bands B1 to B12 are shown as indicating the critical bands and the bands sub-divided from the critical bands in order to take into account the block floating, and the amounts of masking, for simplifying the drawing.

It is noted that an operation of multiplying each spectral component SB by a pre-set weighting function for taking into account the effects of masking is performed by way of convolution. To this end, an output of the band-based energy calculating circuit 22, that is each value of the spectral component SB, is transmitted to a convolution filter circuit 23. The convolution filter circuit 23 is made up of a plurality of delay elements for sequentially delaying input data, a plurality of multipliers, such as 25 multipliers associated with the respective bands, for multiplying outputs of the delay elements with filter coefficients or weighting functions, and an adder for finding the sum of the outputs of the respective multipliers. By such convolution, the sum of the portions indicated by broken lines in FIG. 7 is found. The masking means the phenomenon in which certain signals are masked by other signals and become inaudible due to psychoacoustic characteristics of the human aural sense. The masking effect may be classified into the time-domain masking effect produced by the time-domain audio signals and concurrent masking effect produced by the frequency-domain signals. By this masking, any noise present in a masked portion becomes inaudible. In actual audio signals, the noise within the masked range is an allowable noise.

By way of a concrete example of multiplication coefficients or filter coefficients of the respective filters of the convolution filter circuit 23, if the coefficient of a multiplier M for an arbitrary band is 1, outputs of the delay elements are multiplied by coefficients 0.15, 0.0019, 0.0000086, 0.4, 0.06 and 0.007 at the multipliers M−1, M−2, M−3, M+1, M+2 and M+3, M being an arbitrary integer of from 1 to 25, for performing convolution of the spectral components SB.

An output of the convolution filter circuit 23 is transmitted to a subtractor 24 which is employed for finding a level α corresponding to the allowable noise level in the convolved region. Meanwhile, the allowable noise level α is such a level which will give an allowable noise level for each of the critical bands by deconvolution as will be described subsequently. The subtractor 24 is supplied with an allowance function (a function representative of the masking level) for finding the level α. The level α is controlled by increasing or decreasing the allowance function. The allowance function is supplied from a (N−ai) function generator 25 as will be explained subsequently.

That is, the level a corresponding to the allowable noise level is found from the equation (1):

$$\alpha = S - (n - ai) \quad (1)$$

where i is the number accorded sequentially to the critical bands beginning from the lower side, n and a are constants where a>O and S the intensity of the convolved Bark spectrum. In the equation (1), (n−ai) represents the allowance function. In the present embodiment, by setting so that n=38 and a=1, optimum encoding may be achieved without deterioration in the sound quality.

The level α is found in this manner and transmitted to a divider 26 for deconvolving the level α in the convolved region. By this deconvolution, the masking spectrum is found from the level α. This masking spectrum becomes the allowable noise level. Although the deconvolution necessitates complex arithmetic-logical steps, it is performed in the present embodiment in a simplified manner by using the divider 26.

The masking spectrum is transmitted via a synthesizing circuit 27 to a subtractor 28 which is supplied with an output of the band-based energy detection circuit 22, that is the above-mentioned spectral components SB. The subtractor 28 subtracts the masking spectrum from the spectrum SB for masking the portions of the spectral components SB lower than the level of the masking spectrum MS. The masked spectrum SB is herein termed the allowable noise level.

An output of the subtractor 28 is outputted via an allowable noise correction circuit 30 at an output terminal 31 so as to be transmitted to a ROM, not shown, in which the information concerning the number of the allocated bits is stored previously. The ROM outputs the information concerning the number of allocated bits for each band, depending on an output of the subtraction circuit 28 supplied via an allowable noise correction circuit 30. The information concerning the number of the allocated bits is transmitted to the adaptive bit allocation and encoding circuit 18 to permit the frequency-domain spectral data from the MDCT circuits 13 to 15 to be quantized with the numbers of bits allocated to the respective bands.

In sum, the adaptive bit allocation and encoding circuit 18 quantizes the band-based spectral data with the numbers of bits allocated depending the signal energy in the respective bands and the amount of masking. The delay circuit 29 is employed for delaying the spectral components SB from the energy detection circuit 22 in consideration of the delay produced in the circuitry upstream of the synthesizing circuit 27.

Figure 9:
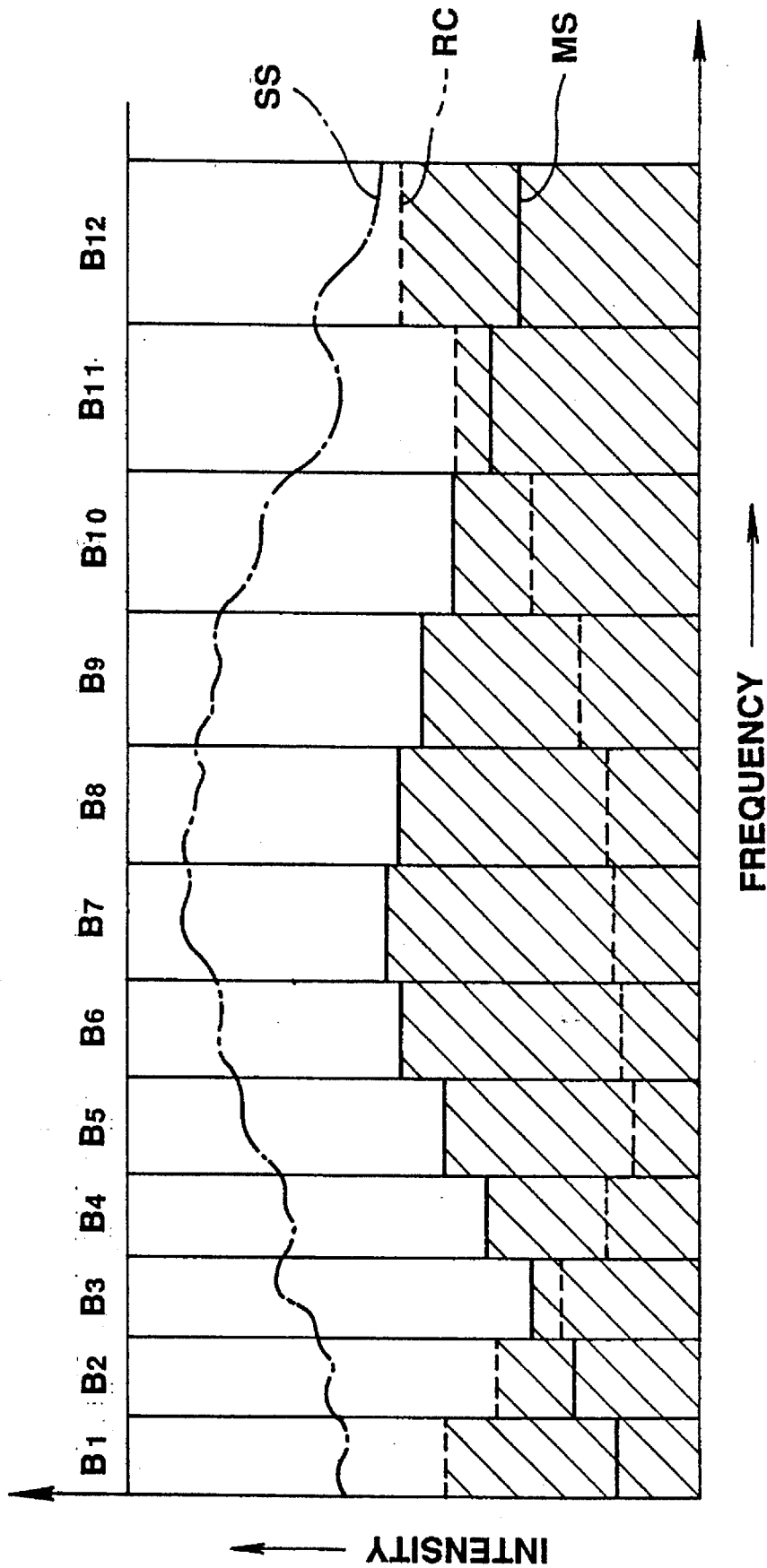
FIG. 9 is a graph showing a minimum audibility curve and the masking spectrum combined together.

The synthesizing circuit 27 may also be designed to synthesize the masking spectrum MS and data from the minimum audibility curve RC from the minimum audibility curve generating circuit 32 representing psychoacoustic characteristics of the human aural sense as shown in FIG. 9. If the absolute noise level is lower than the minimum audibility curve RC, the noise becomes inaudible. The minimum audibility curve differs with the difference in the playback sound level even although the coding is made in the same manner. However, since there is no marked difference in the manner of the music entering the 16-bit dynamic range in actual digital systems, it may be presumed that, if the quantization noise of the frequency range in the vicinity of 4 kHz most perceptible to the ear is not heard, the quantization noise lower than the level of the minimum audibility curve is not heard in any other frequency range.

Thus, if the recording/reproducing device is employed so that the noise in the vicinity of 4 kHz is not heard, and the allowable noise level is to be obtained by synthesizing the minimum audibility curve RC and the masking spectrum MS, the allowable noise level may be up to the level indicated by hatched lines in FIG. 9. In the present embodiment, the level of 4 kHz of the minimum audibility curve is matched to the minimum level corresponding to e.g. 20 bits. In FIG. 9, the signal spectrum SS is also shown.

Besides, the allowable noise correction circuit 30 corrects the allowable noise level in the output of the subtractor 28 based on the information of the equal-loudness curve transmitted from a correction information outputting circuit 33. The equal-loudness curve is a characteristic curve concerning psychoacoustic characteristics of human aural sense, and is obtained by finding the sound pressures of the sound at the respective frequencies heard with the same loudness as the pure tone of 1 kHz and by connecting the sound pressures by a curve. It is also known as an equal loudness sensitivity curve. The equal-loudness curve also delineates a curve which is substantially the same as the minimum audibility curve shown in FIG. 9. With the equal-loudness curve, the sound in the vicinity of 4 kHz is heard with the same loudness as the sound of 1 kHz, even although the sound pressure is decreased by 8 to 10 dB from the sound of 1 kHz. Conversely, the sound in the vicinity of 10 kHz cannot be heard with the same loudness as the sound of 1 kHz unless the sound pressure is higher by about 15 dB than that of the sound of 1 kHz. Thus it may be seen that, in the allowable noise correction circuit 30, the allowable noise level preferably has frequency characteristics represented by a curve conforming to the equal-loudness curve. Thus it may be seen that correction of the allowable noise level in consideration of the equal-loudness curve is in conformity to psychoacoustic characteristics of the human aural sense.

Meanwhile, the correction information output circuit 33 outputs correction data for correcting the allowable noise level based on the information of the error between the amount of the output information at the time of quantization at the adaptive bit allocation and encoding circuit 18 and the target bit rate of the ultimately encoded data. There are occasions wherein the total number of bits as obtained by temporary adaptive bit allocation for the totality of the bit allocation unit blocks is different from the pre-set number of bits (target number of the bits) as determined by the bit rate of the ultimate encoded data and hence the re-allocation of bits is again performed so that the difference becomes equal to zero. That is, if the total number of allocated bits is less than the target number of the bits, the bits corresponding to the difference are allocated to the respective unit blocks in an additive manner, whereas, if the total number of allocated bits is larger than the target number of the bits, the bits corresponding to the difference are allocated to the respective unit blocks in a subtractive manner.

Specifically, an error from the target number of the total number of allocated bits is detected and correction data for correcting the number of allocated bits is outputted by the correction information output circuit 33 depending on the error data. If the error data indicates the shortage of the number of bits, it is probable that more bits are employed per unit block so that the amount of the data is in excess of the target number of bits. If the error data indicates an excess of the number of bits, it is probable that a smaller number of bits per unit block suffices so that the amount of the data is less than the target number. Consequently, the correction information output circuit 33 is responsive to the error data to output data of correction values by which the allowable noise level at an output of the subtractor 28 is corrected based on the information of the equal-loudness curve. The correction values are transmitted to the allowable noise correction circuit 30 for correcting the allowable noise from the subtractor 28.

With the above-described system, quantized spectral data is outputted as the main information, while the scaling factor indicating the state of block floating or the word length data are outputted as the subsidiary information for quantization. The word length is not necessary and may be found in the decoder 73 from the scaling factor information.

Figure 10:
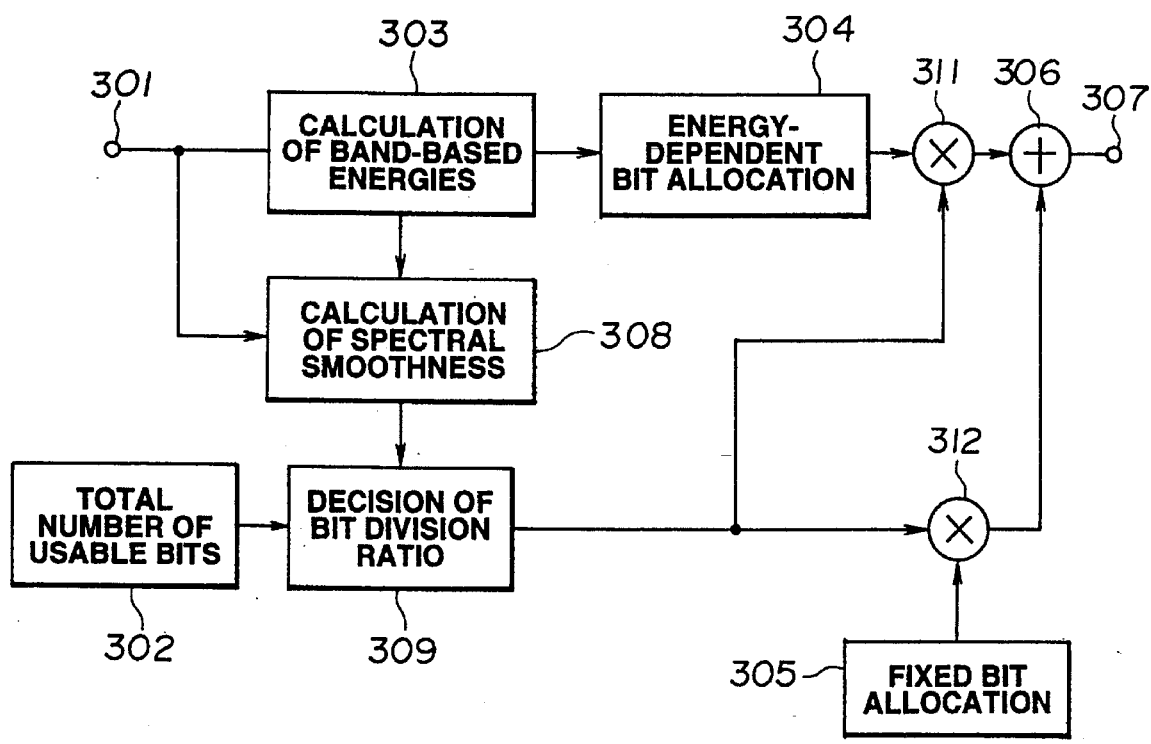
FIG. 10 is a block circuit diagram showing an arrangement for practicing the second method for bit allocation.

The bit allocation calculating circuit 43 is arranged as shown for example in FIG. 10. The following effective technique of bit allocation, which is different from the above-described technique of bit allocation, is explained by referring to FIG. 10.

Outputs of the non-linear processing circuits 40 to 42 in FIG. 10 are transmitted via an input terminal 301 of FIG. 10 to an energy calculating circuit 303 adapted for calculating the band-based energies. In the band-based energy calculating circuit 303, the signal energies for each of the critical bands and each of the sub-divided bands for higher frequencies are found by calculating root mean square values of the amplitudes in the respective bands. Meanwhile, the peak values or mean values of the amplitudes may be employed in place of the band-based energies. The sum of the band-based spectral components for the respective critical bands or the bands sub-divided from the critical bands for the higher frequencies, as outputted from the energy calculating circuit 303, become the spectral components SB (Bark spectrum) shown in FIG. 7.

If, in the present embodiment, the number of bits indicating MDCT coefficients and that may be employed for transmission or recording is 100 kbps, a fixed bit allocation pattern is formed in the present embodiment using the 100 kbps. In the present embodiment, plural bit allocation patterns for the fixed bit allocation are provided and may be selectively employed depending on signal characteristics. In the present embodiment, the fixed bit allocation circuit 305 has a variety of patterns in which the bits of short time blocks corresponding to 100 kbps are distributed for the respective frequencies. The fixed bit allocation circuit 305 has plural patterns having different bit allocation ratios for the mid to low frequencies and for the high frequencies. Such a pattern is selected which has the number of bits allocated to the high frequency smaller for smaller signal magnitudes. Thus it becomes possible to take advantage of the loudness effect in which the sensitivity for the higher frequencies becomes lower for smaller signal magnitudes. Although the magnitude of the full-range signals may be employed as the signal magnitude, it is also possible to utilize an MDCT output or a QMF output. The number of bits indicative of the MDCT coefficients and which may be employed for transmission or recording, that is the total number of usable bits of 100 kbps, is set in e.g. a usable total bit number outputting circuit 302. The total number of bits may be entered from outside.

The energy-dependent bit allocation in the present embodiment is performed in proportion to values obtained by multiplying the dB values of the signal energies of short duration time blocks corresponding to 100 kbps by pre-set block-based coefficients. By setting the weighting coefficients so as to be larger for the lower frequency range, more bits may be allocated to the lower frequency range. Meanwhile, the energy-dependent bit allocation is taken charge of by an energy-dependent bit allocation circuit 304.

That is, the energy-dependent bit allocation circuit 304 has plural patterns of the weighting coefficients in store, as in the case of the above-mentioned fixed bit allocation, and changes over from one pattern to another depending on the input signals, or calculates energy-dependent bit allocation using a weighted pattern obtained by interpolating two weighting coefficient patterns with input signals. In this manner, bit allocation more suited to the aural sense may be achieved with the present embodiment to improve the sound quality by changing the weighting coefficients depending on the input signals.

Referring to FIG. 10, the distribution ratio between the fixed bit allocation pattern and the bit allocation dependent upon the Bark spectrum, for example, is set by an index indicating the smoothness of the signal spectrum. That is, in the present embodiment, an output of the energy calculating circuit 303 is supplied to a spectrum smoothness calculating circuit 308 in which the sum of absolute values of the differences between adjacent values of the signal spectral component data divided by the sum of the signal spectral component data is found as an index which is supplied to a bit distribution ratio decision circuit 309.

The bit distribution ratio data from the bit distribution ratio decision circuit 309 is supplied to a multiplier 312 fed with an output of the fixed bit distribution circuit 305, while being also supplied to a multiplier 311 fed with an output of the energy dependent bit distribution circuit 304. Outputs of these multipliers 312, 311 are supplied to a summing circuit 306. That is, the sum of the fixed bit distribution and the spectrum-dependent bit distribution based on the critical bands and the bands sub-divided from the critical bands for the higher frequencies is found in the summing circuit 306, the resulting sum data being supplied via an output terminal 307 (output terminal of band-based bit allocation) to an adaptive bit allocation encoding circuit so as to be employed for quantization.

Figure 11:
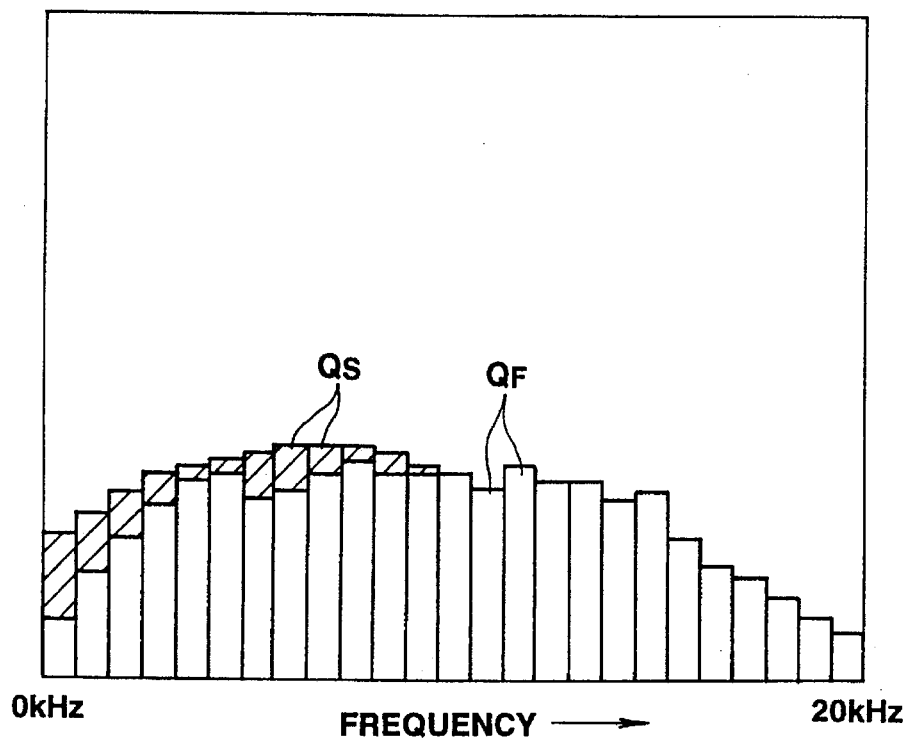
FIG. 11 is a graph showing the noise spectrum for the second method for bit allocation, with the flat signal spectrum.
Figure 12:
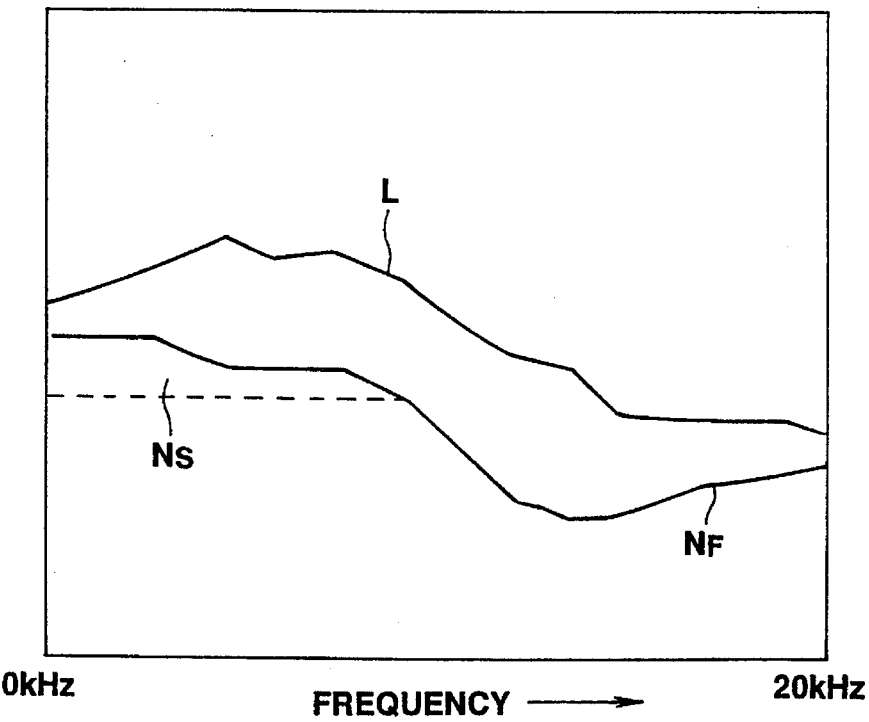
FIG. 12 is a graph showing the bit allocation with the second method for bit allocation, with the flat signal spectrum.
Figure 13:
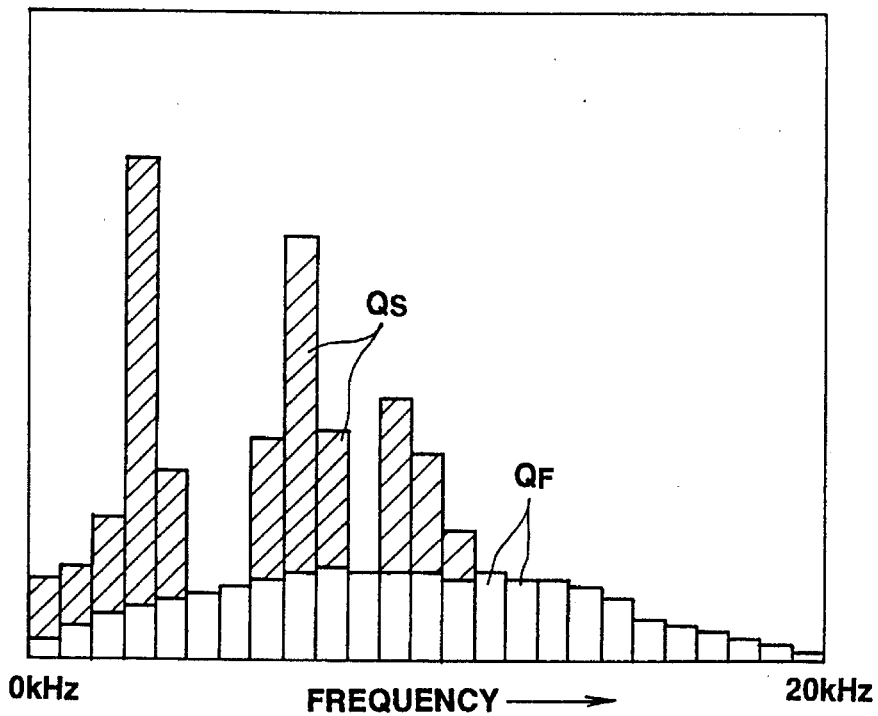
FIG. 13 is a graph showing the noise spectrum with the second method for bit allocation, with the tonality of the signal spectrum being high.
Figure 14:
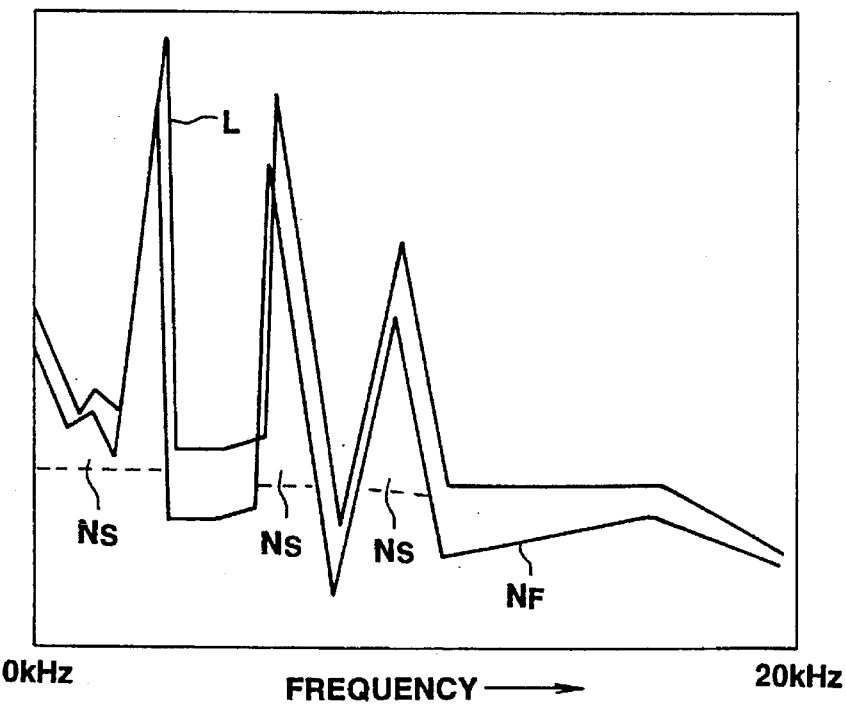
FIG. 14 illustrates bit allocation for the second method for bit allocation, with the tonality of the signal spectrum being high.

The manner of bit allocation at this time is shown in FIGS. 11 and 13. The state of the associated quantization noise is shown in FIGS. 12 and 14. FIGS. 11 and 12 illustrate a flatter signal spectrum, whereas FIGS. 13 and 14 illustrate the signal spectrum exhibiting high tonality. In FIGS. 11 and 13, $Q_S$ indicates the energy-dependent bit quantity, and $Q_F$ indicates the bit quantity corresponding to fixed bit allocation. In FIGS. 12 and 14, L indicates the signal level and $N_S$ and $N_F$ indicate the energy-dependent noise reduction and the noise level due to fixed bit allocation.

In FIGS. 11 and 12 showing the flatter signal spectrum, bit allocation due to a larger amount of the fixed bit allocation is useful in taking a larger signal to noise ratio over the entire frequency range. However, in FIGS. 11 and 12, a smaller number of bits are allocated for the low and high frequency ranges because these ranges are less critical to the aural sense. By energy-dependent allocation of a smaller number of bits for the low and high frequencies, as shown at $Q_S$ in FIG. 11, the noise level of the bands having larger signal magnitudes is selectively reduced. Consequently, the frequency range selectivity becomes broader for a flatter signal spectrum.

Conversely, if the signal spectrum indicates high tonality, as shown in FIGS. 12 and 14, the reduction of the quantization noise by a large number of bits by the energy-dependent bit allocation is employed for reducing the noise of an extremely narrow band indicated by $N_S$ in FIG. 14. This improves characteristics of the quantization noise for an input signal having a lone spectral component. Besides, the noise level may be non-selectively reduced over a wide frequency range by the smaller number of bits corresponding to the fixed bit allocation.

A block selection circuit 20 detects a block for which a sufficiently high signal-to-noise ratio cannot be set. The non-linear processing circuits 40, 41, 42 process the blocks selected by the block selection circuit 20 with the following non-linear signal processing in order to reduce the quantization noise. That is, the frequency-domain data, which is the MDCT output, is processed with an operation of conversion for enlarging the magnitude of the spectral component smaller than the maximum spectrum or reducing the magnitude to zero for each critical band and for each band sub-divided from the critical band in view of block floating.

This will be explained by referring to FIG. 15.

Figure 15:
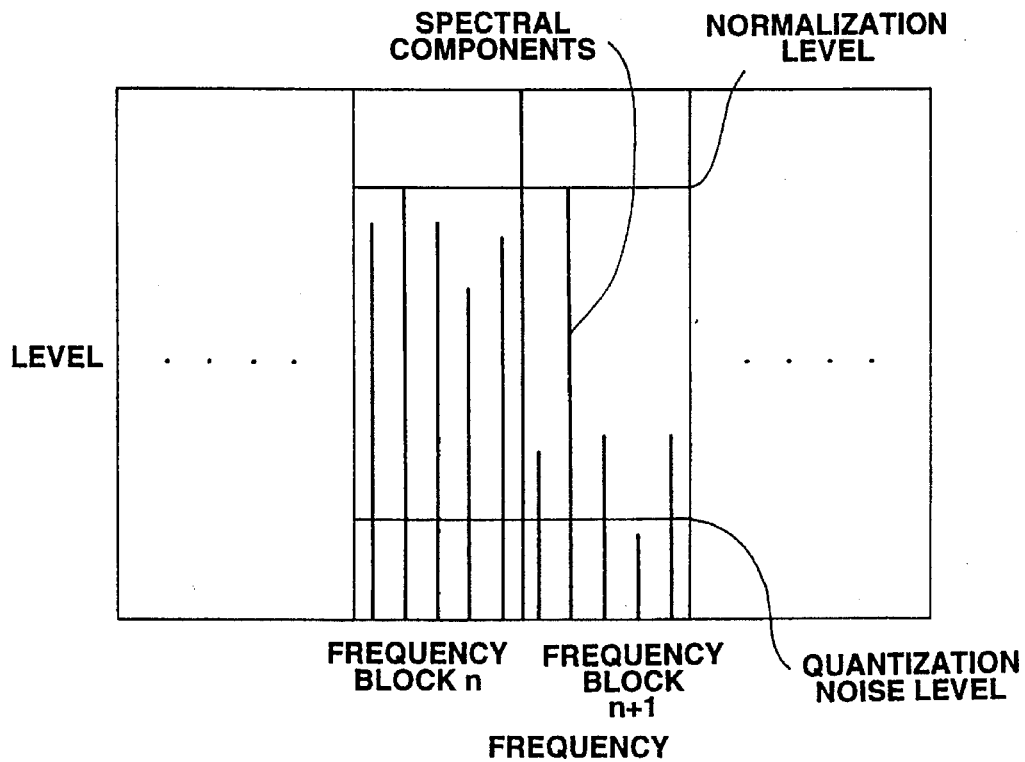
FIG. 15 illustrates the difference in the signal-to-noise ratio produced by the difference in signal tonality.

FIG. 15 shows frequency blocks for block floating where there are five frequency spectral components for a given block ni, where i is an integer, such as frequency blocks n and n+1. Since the spectral components are similar to one another with the frequency block n, the signal-to-noise ratio becomes approximately equal for the respective components if quantization is carried out using a common word length and block floating. Thus the high signal-to-noise ratio may be efficiently achieved for the respective spectral components even with the use of the word length information and the block floating information common to the respective spectral components within the block.

Conversely, with the frequency block n+1, the respective spectral components are not similar in magnitude to one another. If a few spectral components are significantly larger in magnitude than a majority of other spectral components, a sufficiently high signal-to-noise ratio can be achieved with only a few spectral components. Although expectations may possibly be made of the masking effect by the spectral component significantly large in magnitude, the masking effect afforded by the spectral component larger in level is known to be markedly smaller than the masking effect afforded by noise components. As a result, the spectral components having a smaller signal-to-noise ratio in general deteriorate the sound quality.

According to the present invention, the masking effect is checked with respect to spectral components for which the signal-to-noise ratio cannot be set to a higher value. If the masking effect is not significant, zero bit is allocated to the spectral component for which the signal-to-noise ratio cannot be set to a larger value, for reducing the quantization value to zero. Alternatively, if one or more bit are allocated to such component, the spectral component is deformed for increasing its magnitude for providing a larger signal-to-noise ratio before proceeding to normalization and quantization by the adaptive bit allocation and encoding circuit 18.

The operation of the non-linear processing circuits 40 to 42 is now explained by referring to FIG. 18. It is assumed that the frequency block n+1 has been selected by the block selection circuit 20 as being a block for carrying out the non-linear processing operation.

Figure 16:
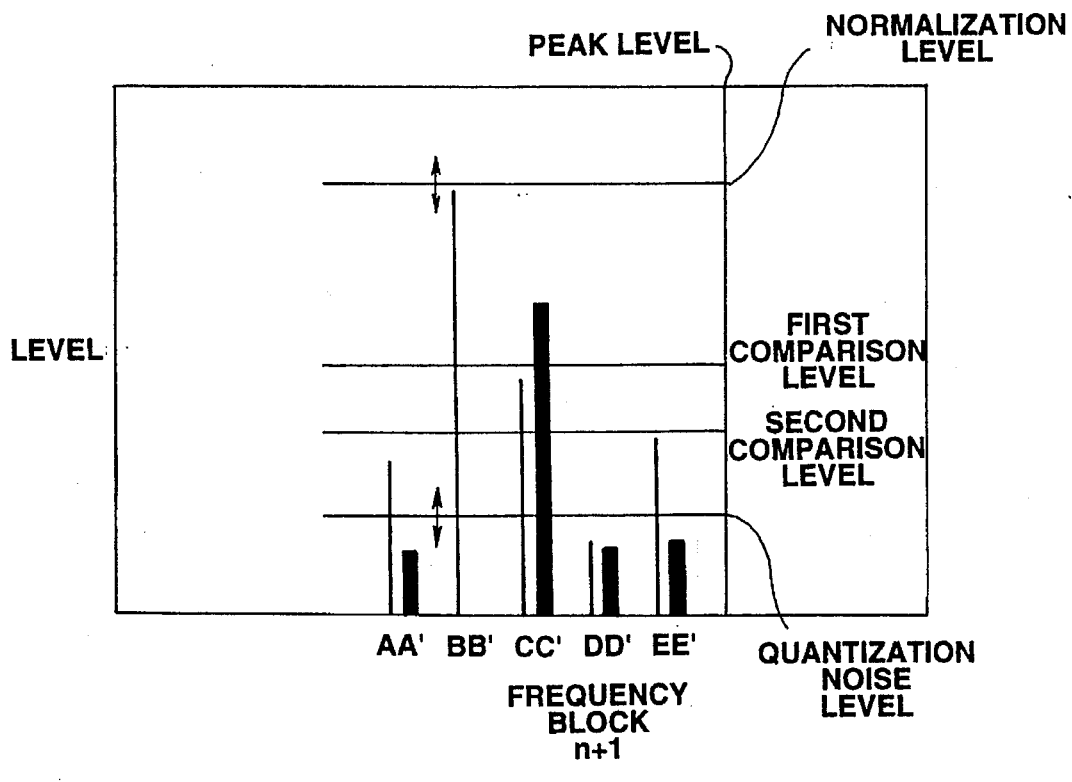
FIG. 16 illustrates non-linear conversion for adaptability to blocks with a low signal-to-noise ratio.

In FIG. 16, five spectral components A, B, C, D and E of the frequency block n+1 for block floating are considered. Since the spectral component B gives the maximum value, the normalization level is determined by the spectral component B.

A first comparison level and a second comparison level lower by about 12 dB and 18 dB than the normalization level are set. As for a spectral component having its level between the first and second comparison levels, the spectral component is increased in magnitude for increasing the signal-to-noise ratio. As a method for increasing the magnitude of the spectral component, the level is set so as to be lower than the normalization level by 6 dB.

Referring to FIG. 16, the spectral component A is smaller than the second comparison level, so that it is further reduced such that the quantization output is reduced to zero, as at the spectral component A'. The spectral component B, having the maximum value, is not modified. The spectral component C, which is intermediate between the first and second comparison levels, is increased further, that is changed as at a spectral component C'. The spectral components D and E, smaller in magnitude than the second comparison level, is reduced until the quantization output is reduced to zero. Although not shown in FIG. 16, the spectral component larger in magnitude than the first comparison level gives a sufficiently high signal-to-noise ratio, even if the spectral component remains unchanged, so that no processing is carried out.

Alternatively, the first and second comparison levels may be rendered variable depending on the value of the maximum spectral component in the frequency block. To this end, the first comparison level is set so as to be lower the larger the value of the maximum spectral component in the frequency block, or the second comparison level is set so as to be higher the larger the value of the maximum spectral component in the frequency block. Still alternatively, the first and second comparison levels may be rendered lower and higher the larger the magnitude of the maximum spectral component in the frequency block. By having the first and second comparison levels changed in dependence upon the magnitude of the maximum spectral component in the block, selection may be made in a manner more amenable to the aural sense. Although changes in the sound quality becomes larger, the respective spectral components may be set to smaller values so that the quantization values become equal to zero for the spectral components smaller in magnitude than the first comparison level.

As means for determining at the block selection circuit 20 whether or not the above-mentioned non-linear processing is to be performed within the block, the block selection circuit 20 may be configured similarly to the above-mentioned bit allocation calculating circuit 43, in which case virtual bit allocation is calculated using outputs of the MDCT circuits 13 to 15 and selection is made on the basis of the word length of each block as determined by the virtual bit allocation. Specifically, only the block for which the quantization noise level becomes lower by 24 dB or more from the normalization level, that is the block having the word length of 4 bits or less, is to be processed non-linearly.

As another means for determining whether or not such non-linear processing is to be performed within the frequency block, the ratio values of the effective value of at least a spectral component larger in magnitude and the effective values of the remaining spectral components may be found in the block selection circuit 20 as indicating tonality.

In the present embodiment, a frequency block is selected as a block to be processed non-linearly if, with such frequency block, the effective value of the spectral component largest in magnitude, that is having the maximum signal-to-noise ratio, to the effective value of the remaining spectral component, is not less than 10 dB, and if the value of the maximum spectral component in the frequency block is not less than a certain level. In the present embodiment, this level is −40 dB from the peak level. This renders it possible to avoid wasteful processing of low-level signals which are less liable to aurally foreign feeling.

The frequency range for such non-linear processing may be limited to a specific frequency range. Above all, by limiting the range for non-linear processing to a high frequency range, it becomes possible to limit changes in the sound quality to a minimum. Actual bit allocation is executed after such non-linear processing. Ultimate bit allocation is determined in consideration of the spectral components increased in magnitude by the non-linear processing and those reduced to zero magnitude.

In the present embodiment, as described above, the signal components larger in magnitude, excluding the maximum value in the block, are processed non-linearly for increasing the magnitudes thereof for increasing the signal-to-noise-ratio for increasing the masking effect.

On the other hand, the signal components smaller in magnitude, excluding the maximum value in the block, are processed non-linearly for decreasing the magnitudes thereof for increasing the signal-to-noise ratio for prohibiting the noise from being produced from signals having a low signal-to-noise ratio.

By non-linearly processing only the blocks having the word length as determined by the virtual bit allocation smaller than a pre-set length, deterioration in the sound quality may be suppressed to a minimum.

By selecting the non-linearly processed blocks based upon the tonality of the respective blocks, only the block in need of non-linear processing need to be processed, thus rendering it possible to reduce deterioration in the sound quality to a minimum. On the other hand, by finding the tonality from a value derived from at least one of the signal components in the block having at least the maximum signal-to-noise ratio and one of the signal components excluding such component, for example, the ratio between the effective values of the components, only those blocks can be selected from which the masking effects cannot be expected judging from the human aural sense.

The present invention is not limited to the above-described embodiments, but may be applied to a signal processing device for processing not only digital audio signals but also digital speech signals or digital video signals. The synthesis operation of the minimum audibility curve may be dispensed with, in which case the minimum audibility curve generating circuit 32 as well as the synthesis circuit 27 is dispensed with and an output of the subtractor 24 may be directly transmitted to a subtractor 28 after deconvolution by the divider 26. Besides, a variety of bit allocation techniques may be utilized, the simplest techniques being fixed bit allocation, simple bit allocation based upon signal band energies or the bit allocation consisting in the combination of the fixed bit allocation and variable bit allocation. The magneto-optical disc i may be driven at a rotational velocity faster than a steady-state velocity for effecting dubbing at a rate faster than the bit compression ratio. In such case, the high-speed dubbing may be realized within a range compatible with the data transfer rate.

Figure 17:
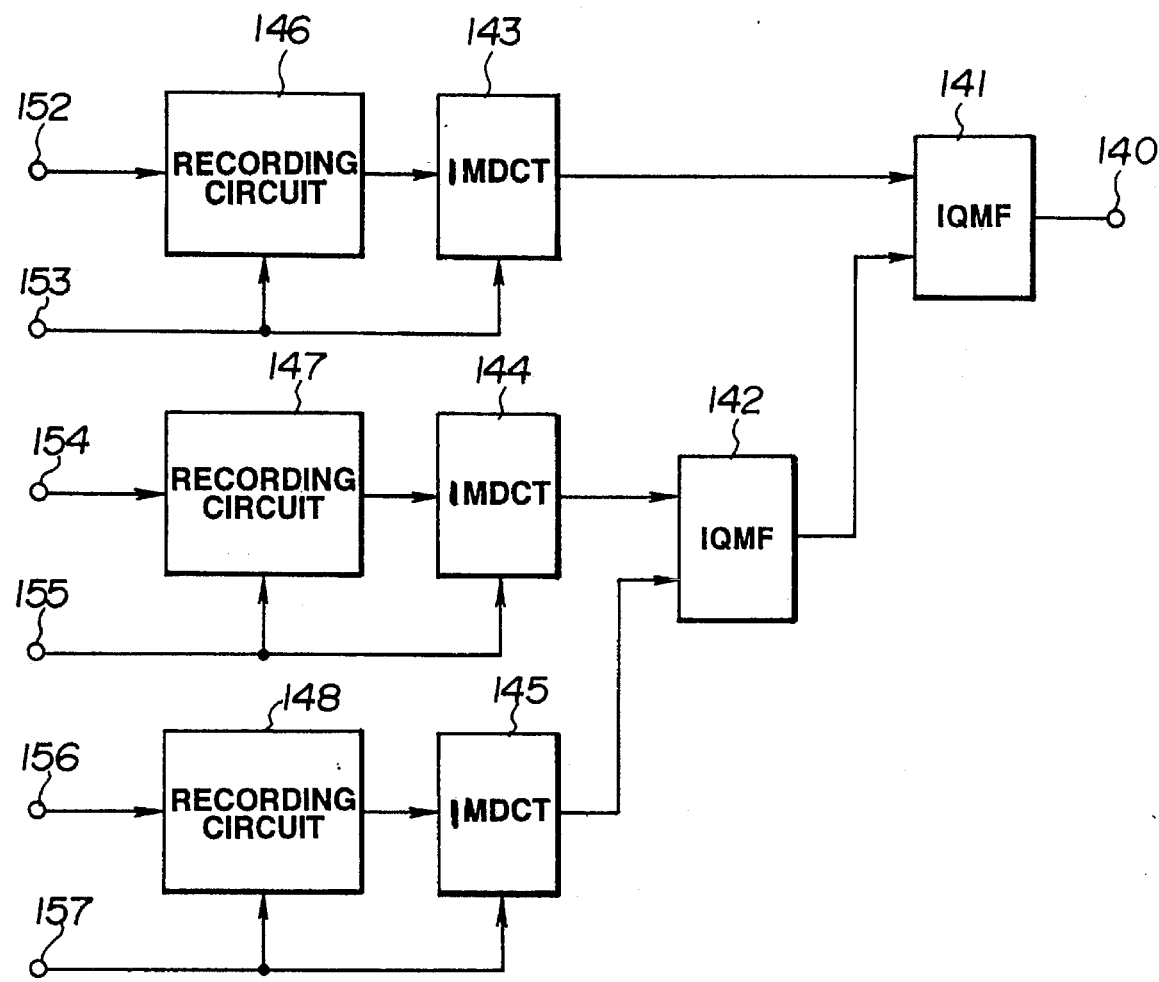
FIG. 17 is a block circuit diagram for illustrating a practical example of a high efficiency decoder that may be employed for bit rate conversion.

A high efficiency decoding device, which is a counterpart of the high efficiency encoding device in the digital signal processing method according to the present invention, is shown in FIG. 17.

In FIG. 17, encoded data, which is the high-efficiency encoded main information, is fed to input terminals 152, 154, 156, and thence is fed to associated decoding circuits 146, 147 and 148. These decoding circuits are fed with information compression parameters, as the subsidiary information, via associated terminals 153, 155, 157. These decoding circuits 146, 147 and 148 decode the encoded data using the information compression parameters for restoring the frequency-domain data.

Output data of the decoding circuits 146, 147 and 148 are sent to associated IMDCT circuits 143, 144 and 145. In these IMDCT circuits, the IMDCT operation, which is the inverse operation of the above-mentioned MDCT, is performed. Of the spectral data from the decoding circuits 146 to 148, the spectral data in a frequency range of from 0 to 5.5 kHz, the spectral data in a frequency range of from 5.5 to 11 kHz and the spectral data in a frequency range of from 11 to 22 kHz are processed by IMDCT by the IMDCT circuits 145, 144 and 143, respectively.

An output of the IMDCT circuit 143 is sent to a spectrum synthesis filter (IQMF) circuit 141 which performs an inverse operation of that performed by the spectrum dividing filter 11. Outputs of the IMDCT circuits 144, 145 are sent to a spectrum synthesis filter (IQMF) circuit 142 which performs an inverse operation of that performed by the spectrum dividing filter 12. An output of the spectrum synthesis circuit 142 is also fed to the spectrum synthesis filter circuit 141. Thus the spectrum synthesis filter circuit 141 outputs a digital audio signal which is synthesized from signals divided into the above-mentioned frequency ranges. This digital audio signal is outputted at an output terminal 140.

What is claimed is:

1. A recording medium having an encoded digital signal recorded thereon, said recording medium being prepared by the steps of:

converting a digital signal into signal components in a plurality of blocks, each block having a finite time width and a finite frequency width;

non-linearly processing signal components of at least some of the blocks; and quantizing the non-linearly processed signal components for generating recording data, and recording said recording data on the recording medium, wherein said signal components are spectral components and said step of non-linearly processing includes enlarging the spectral components except at least the spectral component which gives the maximum value in each block.

2. A digital signal processing method, comprising the steps of:

converting a digital signal into signal components in a plurality of blocks, each block having a finite time width and a finite frequency width;

non-linearly processing the signal components of at least some of the blocks; and quantizing the non-linearly processed signal components, wherein said signal components are spectral components and said step of non-linearly processing includes enlarging the spectral components except at least the spectral component which gives the maximum value in each block.

3. A digital signal processing method, comprising the steps of:

converting a digital signal into signal components in a plurality of blocks, each block having a finite time width and a finite frequency width;

non-linearly processing the signal components of at least some of the blocks; and quantizing the non-linearly processed signal components, wherein said step of non-linearly processing includes reducing the quantization value by said quantization of the signal component excluding at least the signal component having the maximum signal-to-noise ratio in each block to zero.

4. A digital signal processing method, comprising the steps of:

converting a digital signal into signal components in a plurality of blocks, each block having a finite time width and a finite frequency width;

non-linearly processing the signal components of at least some of the blocks; and quantizing the non-linearly processed signal components, wherein said signal components are spectral components and the digital signal processing method includes normalizing said signal components, and wherein said step of non-linearly processing includes enlarging the spectral components having magnitudes intermediate between a first comparison level lower than the normalization level for said normalization and a second comparison level smaller than said first comparison level, or reducing the quantization value of said spectral component by said quantization to zero, and reducing the quantization value by said quantization of the spectral component smaller in magnitude than said second comparison level to zero.

5. The digital signal processing method as claimed in claim 4, wherein said first comparison level and the second comparison level are variable depending on the maximum value of the spectral component in each block.

6. The digital signal processing method as claimed in claim 5, wherein the larger the maximum spectral value in each block, at least one of said first comparison level and said second comparison level becomes lower and higher, respectively.

7. A digital signal processing method, comprising the steps of:

converting a digital signal into signal components in a plurality of blocks, each block having a finite time width, a finite frequency width and signal components;

non-linearly processing the signal components of at least some of the blocks;

quantizing the non-linearly processed signal components; and selecting a block having the word length as determined by bit allocation found on the basis of said signal component prior to said non-linear processing shorter than a pre-set word length as a block to be processed non-linearly.

8. A digital signal processing method, comprising the steps of:

converting a digital signal into signal components in a plurality of blocks, each block having a finite time width and a finite frequency width, wherein said signal components are spectral components;

non-linearly processing the signal components of at least some of the blocks;

quantizing the non-linearly processed signal components; and selecting the block to be processed non-linearly on the basis of the maximum spectral value in each block.

9. The digital signal processing method as claimed in claim 8, wherein, if the maximum spectral value of a block is not less than a pre-set value, the block is selected as a block to be processed non-linearly.

10. A digital signal processing method, comprising the steps of:

converting a digital signal into signal components in a plurality of blocks, each block having a finite time width and a finite frequency width;

non-linearly processing the signal components of at least some of the blocks;

quantizing the non-linearly processed signal components; and selecting the block to be processed non-linearly on the basis of tonality in each block.

11. The digital signal processing method as claimed in claim 10, wherein said signal components are spectral components, and wherein said tonality is found on the basis of a first component which at least is the spectral component among the spectral components in each block having the maximum signal-to-noise ratio and a second component having spectral components in each block excluding said first component.

12. The digital signal processing method as claimed in claim 11, wherein said tonality is a ratio of a first value derived from said first component and a second value derived from said second component.

13. The digital signal processing method as claimed in claim 12, wherein said first value is an effective value of said first component and said second value is an effective value of said second component.

14. A recording medium having an encoded digital signal recorded thereon, said recording medium being prepared by the steps of:

converting a digital signal into signal components in a plurality of blocks, each block having a finite time width and a finite frequency width;

non-linearly processing signal components of at least some of the blocks; and quantizing the non-linearly processed signal components for generating recording data, and recording said recording data on the recording medium, wherein said step of non-linearly processing includes reducing the quantization value by said quantization of the signal component excluding at least the signal component having the maximum signal-to-noise ratio in each block to zero.

15. A digital signal processing apparatus, comprising:

means for converting a digital signal into signal components in a plurality of blocks, each block having a finite time width and a finite frequency width;

non-linear processing means for non-linearly processing the signal components in at least some of said blocks; and encoding means for quantizing the non-linearly processed signal components, wherein said signal components are spectral components and said non-linear processing means enlarges the spectral components except at least the spectral component which gives the maximum value in each block.

16. A digital signal processing apparatus, comprising:

means for converting a digital signal into signal components in a plurality of blocks, each block having a finite time width and a finite frequency width;

non-linear processing means for non-linearly processing the signal components in at least some of said blocks; and encoding means for quantizing the non-linearly processed signal components, wherein said non-linear processing means reduces the quantization value by said quantization of the signal component excluding at least the signal component having the maximum signal-to-noise ratio in each block to zero.

17. A digital signal processing apparatus, comprising:

means for converting a digital signal into signal components in a plurality of blocks, each block having a finite time width and a finite frequency width;

non-linear processing means for non-linearly processing the signal components in at least some of said blocks; and encoding means for quantizing the non-linearly processed signal components, wherein said signal components are spectral components and said encoding means normalizes said signal components, and wherein said non-linear processing means enlarges the spectral components having magnitudes intermediate between a first comparison level lower than the normalization level for said normalization and a second comparison level smaller than said first comparison level, or reduces the quantization value of said spectral component by said quantization to zero, said non-linear processing means reducing the quantization value by said quantization of the spectral component smaller in magnitude than said second comparison level to zero.

18. The digital signal processing apparatus as claimed in claim 17, wherein said first comparison level and the second comparison level are variable depending on the maximum value of the spectral component in each block.

19. The digital signal processing apparatus as claimed in claim 18, wherein the larger the maximum spectral value in each block, at least one of said first comparison level and said second comparison level becomes lower and higher, respectively.

20. A digital signal processing apparatus, comprising:

means for converting a digital signal into signal components in a plurality of blocks, each block having a finite time width and a finite frequency width;

non-linear processing means for non-linearly processing the signal components in at least some of said blocks;

encoding means for quantizing the non-linearly processed signal components; and means for selecting a block having a word length as determined by bit allocation found on the basis of said signal component prior to said non-linearly processing a shorter than a pre-set word length as a block to be processed non-linearly.

21. A digital signal processing apparatus, comprising:

means for converting a digital signal into signal components in a plurality of blocks, each block having a finite time width and a finite frequency width;

non-linear processing means for non-linearly processing the signal components in at least some of said blocks;

encoding means for quantizing the non-linearly processed signal components; and means for selecting the block to be processed non-linearly on the basis of the maximum spectral value in each block.

22. The digital signal processing apparatus as claimed in claim 21, wherein, if the maximum spectral value of a block is not less than a pre-set value, the block is selected as a block to be processed non-linearly.

23. A digital signal processing apparatus, comprising:

means for converting a digital signal into signal components in a a plurality of blocks, each block having a finite time width and finite frequency width;

non-linear processing means for non-linearly processing the signal components in at least some of said blocks;

encoding means for quantizing the non-linearly processed signal components; and means for selecting the block to be processed non-linearly on the basis of tonality in each block.

24. The digital signal processing apparatus as claimed in claim 23, wherein said signal components are spectral components, and wherein said tonality is found on the basis of a first component which at least is the spectral component among the spectral components in each block having the maximum signal-to-noise ratio and a second component composed of spectral components in each block excluding said first component.

25. The digital signal processing apparatus as claimed in claim 24, wherein said tonality is a ratio of a first value derived from said first component and a second value derived from said second component.

26. The digital signal processing apparatus as claimed in claim 25, wherein said first value is an effective value of said first component and said second value is an effective value of said second component.

27. A recording medium having an encoded digital signal recorded thereon, said recording medium being prepared by the steps of:

converting a digital signal into signal components in a plurality of blocks, each block having a finite time width and a finite frequency width, wherein the signal components are spectral components;

non-linearly processing signal components of at least some of the blocks;

quantizing the non-linearly processed signal components for generating recording data, and recording said recording data on the recording medium; and selecting the block to be processed non-linearly on the basis of the maximum spectral value in each block.

28. The recording medium as claimed in claim 27, wherein, if the maximum spectral value of a block is not less than a pre-set value, the block is selected as a block to be processed non-linearly.

29. The recording medium as claimed in claim 28, prepared by a further step of:

selecting the block to be processed non-linearly on the basis of tonality in each block.

30. The recording medium as claimed in claim 29, wherein said signal components are spectral components, and wherein said tonality is found on the basis of a first component which at least is the spectral component among the spectral components in each block having the maximum signal-to-noise ratio and a second component composed of spectral components in each block excluding said first component.

31. The recording medium as claimed in claim 30, wherein said tonality is a ratio of a first value derived from said first component and a second value derived from said second component.

32. The recording medium as claimed in claim 31, wherein said first value is an effective value of said first component and said second value is an effective value of said second component.

33. A recording medium having an encoded digital signal recorded thereon, said recording medium being prepared by the steps of:

converting a digital signal into signal components in a plurality of blocks, each block having a finite time width and a finite frequency width;

non-linearly processing signal components of at least some of the blocks;

quantizing the non-linearly processed signal components for generating recording data, and recording said recording data on the recording medium; and selecting a block having the word length as determined by bit allocation found on the basis of said signal component prior to said non-linear processing shorter than a preset word length as a block to be processed non-linearly.

34. A recording medium having an encoded digital signal recorded thereon, said recording medium being prepared by the steps of:

converting a digital signal into signal components in a plurality of blocks, each block having a finite time width and a finite frequency width;

non-linearly processing signal components of at least some of the blocks; and quantizing the non-linearly processed signal components for generating recording data, and recording said recording data on the recording medium, wherein said signal components are spectral components and the recording data is generated by normalizing said signal components, and wherein said non-linear processing includes enlarging the spectral components having magnitudes intermediate between a first comparison level lower than the normalization level for said normalization and a second comparison level smaller than said first comparison level, or reducing the quantization value of said spectral component by said quantization to zero, and reducing the quantization value by said quantization of the spectral component smaller in magnitude than said second comparison level to zero.

35. The recording medium as claimed in claim 34, wherein said first comparison level and the second comparison level are variable depending on the maximum value of the spectral component in each block.

36. The recording medium as claimed in claim 35, wherein the larger the maximum spectral value in each block, at least one of said first comparison level and said second comparison level becomes lower and higher, respectively.

* * * * *